US011870513B2

(12) United States Patent
Luo et al.

(10) Patent No.: US 11,870,513 B2
(45) Date of Patent: Jan. 9, 2024

(54) NEURON CALCULATOR FOR ARTIFICIAL NEURAL NETWORKS

(71) Applicant: MICRON TECHNOLOGY, INC., Boise, ID (US)

(72) Inventors: Fa-Long Luo, San Jose, CA (US); Jaime Cummins, Bainbridge Island, WA (US); Tamara Schmitz, Scotts Valley, CA (US); Jeremy Chritz, Seattle, WA (US)

(73) Assignee: Micron Technology, Inc., Boise, ID (US)

( * ) Notice: Subject to any disclaimer, the term of this patent is extended or adjusted under 35 U.S.C. 154(b) by 37 days.

(21) Appl. No.: 17/362,672

(22) Filed: Jun. 29, 2021

(65) Prior Publication Data

US 2021/0328631 A1    Oct. 21, 2021

Related U.S. Application Data

(63) Continuation of application No. 16/786,637, filed on Feb. 10, 2020, now Pat. No. 11,070,257, which is a
(Continued)

(51) Int. Cl.
*G06K 9/00* (2022.01)
*H04B 7/0413* (2017.01)
(Continued)

(52) U.S. Cl.
CPC .............. *H04B 7/0413* (2013.01); *G06N 3/04* (2013.01); *G06N 3/08* (2013.01)

(58) Field of Classification Search
CPC .......... H04B 7/0413; G06N 3/04; G06N 3/08; G06N 3/063; G06N 3/045; G06N 3/044;
(Continued)

(56) References Cited

U.S. PATENT DOCUMENTS 10,601,471 B1    3/2020 Luo et al.
10,637,544 B1 *  4/2020 Shattil .................. H04B 7/0473
(Continued)

FOREIGN PATENT DOCUMENTS

KR    20150133276 A    11/2015
WO    2020047254 A1    3/2020

OTHER PUBLICATIONS

International Search Report and Written Opinion for Application No. PCT/US2019/048810, dated Dec. 13, 2019, pp. all.
(Continued)

*Primary Examiner* — Dhaval V Patel
(74) *Attorney, Agent, or Firm* — Dorsey & Whitney LLP

(57) ABSTRACT

Examples described herein include systems and methods, including wireless devices and systems with neuron calculators that may perform one or more functionalities of a wireless transceiver. The neuron calculator calculates output signals that may be implemented, for example, using accumulation units that sum the multiplicative processing results of ordered sets from ordered neurons with connection weights for each connection between an ordered neuron and outputs of the neuron calculator. The ordered sets may be a combination of some input signals, with the number of signals determined by an order of the neuron. Accordingly, a $k^{th}$-order neuron may include an ordered set comprising product values of k input signals, where the input signals are selected from a set of k-combinations with repetition. As an example in a wireless transceiver, the neuron calculator may perform channel estimation as a channel estimation processing component of the receiver portion of a wireless transceiver.

18 Claims, 10 Drawing Sheets

Related U.S. Application Data continuation of application No. 16/115,866, filed on Aug. 29, 2018, now Pat. No. 10,601,471.

(51) Int. Cl.
*G06N 3/08* (2023.01)
*G06N 3/04* (2023.01)

(58) Field of Classification Search
CPC ........ G06N 3/048; G06N 3/084; G06N 3/086;
G06N 3/047; G06N 3/088; G06N 3/10;
G06N 5/046; G06N 20/00; G06N 20/10;
G06N 3/0464; G06V 10/82; G06V
10/443; G06V 10/464; G06V 20/46;
G06V 10/462; G06V 10/764; G06V
20/58; G06V 20/588; G06V 2201/03;
G06V 10/454; G06V 10/758; G06V
10/761; G06V 10/7747; G06V 20/69;
G06V 30/19173; G06V 30/32; G06T
2207/10088; G06T 2207/20084; G06T
2207/20081; G06T 7/0012; G06T 5/002;
G06T 2207/10016; G06T 2207/10024;
G06T 2207/10116; G06T 2207/20016;
G06T 2207/20056; G06T 2207/20204;
G06T 2207/30004; G06T 2207/30068;
G06T 2207/30096; G06T 5/10; G06T
7/12; G06T 7/33; G06T 9/00; G06T
11/00; G06T 11/006; G06T 17/20; G06T
17/205; G06T 2200/04; G06T
2207/10004; G06T 2207/10028; G06T
2207/10081; G06T 2207/20021; G06T
2207/20032; G06T 2207/20044; G06T
2207/20192; G06T 2207/20221; G06T
2207/30016; G06T 2207/30132; G06T
2207/30204; G06T 2207/30244; G06T
3/0006; G06T 5/20; G06T 7/0004; G06T
7/13; G06T 7/136; G06T 7/155; G06T
7/181; G06T 7/337; G06T 7/37; G06T
7/62; G06T 7/70; G06T 7/80; G06T 9/20
See application file for complete search history.

(56) References Cited

U.S. PATENT DOCUMENTS

| | | |
|---|---|---|
| 11,070,257 B2 | 7/2021 | Luo et al. |
| 2011/0195670 A1 | 8/2011 | Dakshinamurthy et al. |
| 2012/0149412 A1 | 6/2012 | Nergis et al. |
| 2014/0086077 A1 | 3/2014 | Safavi |
| 2015/0118970 A1 | 4/2015 | Thoukydides et al. |
| 2017/0310508 A1 | 10/2017 | Moorti et al. |
| 2019/0180174 A1 | 6/2019 | Koswatta et al. |
| 2019/0223002 A1* | 7/2019 | Novlan ............ H04W 72/0406 |
| 2019/0332928 A1* | 10/2019 | Wang ..................... G11C 11/54 |
| 2020/0076481 A1 | 3/2020 | Luo et al. |
| 2020/0177244 A1 | 6/2020 | Luo et al. |
| 2021/0410086 A1* | 12/2021 | Davydov ............. H04W 56/00 |

OTHER PUBLICATIONS

PCT Application No. PCT/US19/48810 titled "Neuron Calculator For Artificial Neural Networks" filed on Aug. 29, 2019, pp. all.
U.S. Appl. No. 16/786,637, titled "Neuron Calculator for Artificial Neural Networks", dated Feb. 10, 2020, pp. all.
U.S. Appl. No. 16/115,866 titled "Neuron Calculator for Artificial Neural Networks" filed Aug. 29, 2018, pp. all.
Extended European Searh Report dated May 11, 2022 for EP Appl. No. 19856133.4; pp. all.
Bhuyan, Manasjyoti, et al., "Nonlinear Mobile Link Adaption Using Modified FLNN and Channel Sounder Arrangement", IEEE Access, vol. 5, Apr. 2017, 13 pages.
Hassim, et al., "Solving a Classification Task Using Functional Link Neural Networks With Modified Artificial Bee Colony", Ninth ICNC, IEEE, Jul. 2013, 5 pages.

* cited by examiner

NEURON CALCULATOR FOR ARTIFICIAL NEURAL NETWORKS

CROSS REFERENCE TO RELATED APPLICATION(S)

This application is a continuation of U.S. patent application Ser. No. 16/786,637 filed Feb. 10, 2020 and issued as U.S. Pat. No. 11,070,257 on Jul. 20, 2021, which application is a continuation of U.S. patent application Ser. No. 16/115,866 filed Aug. 29, 2018 and issued as U.S. Pat. No. 10,601,471 on Mar. 24, 2020. The aforementioned applications, and issued patents, are incorporated herein by reference, in its entirety, for any purpose.

BACKGROUND

Artificial neural networks are used in many applications, including image and speech recognition. Fifth generation (5G) wireless communication systems, including those employing multiple-input multiple-output (MIMO) techniques or "massive MIMO" techniques, in which multiple antennas (more than a certain number, such as 8 in the case of example MIMO systems) are utilized for transmission and/or receipt of wireless communication signals, also have applications for artificial neural networks. However, in increasing the learning of neural networks, the number of neurons and corresponding weights of the neural network may increase exponentially, overwhelming the memory and power limits of devices implementing such schemes.

DETAILED DESCRIPTION

Neural networks continue to be utilized in various memory-intensive and power-intensive applications, such as image recognition, wireless communication and speech recognition. Due in part to such memory and power demands, processor implementations may become more costly as neural networks grow larger. For example, the numbers of the weights and/or dimensions of weight matrices that are used to connect neurons may increase exponentially as the number of layers of neural networks increases and/or additional neurons are added to a network. To meet these demands, in some neural network applications, weights may be compressed and/or pruned to reduce the number of weights and/or neurons. However, because an additional, often onerous, process may be employed to identify and determine which weights to reduce, such pruning or compression of neural networks may often not be implemented without introducing additional complexity to the neural network, such as increased power or memory consumption. For example, weights in conventional schemes may be determined using a least-mean squares algorithm to produce weights with a large precision value, which may undesirably utilize additional memory.

Examples described herein may calculate and provide ordered sets for neural networks that utilize input signals as the basis for the ordered sets, thereby forming a neural network that utilizes less memory, or that uses memory more efficiently, than conventional schemes. In contrast to examples of conventional neural network arrangements that may store weights/parameters unrelated to the input signals, the systems and methods described herein may utilize input signals which may already be allocated memory storage as the basis for computing weights and/or elements of the neural network.

By associating neurons in a neural network with certain combinations of the input signals, the number of elements may be finite, thereby facilitating memory allocation. An additional advantage of such memory allocation includes increasing processed speed (e.g., by utilizing already known input signals); in contrast to conventional neural networks that may decrease processing speed, while attempting to increase a precision of a given neural network. For example, in accordance with examples of methods and systems described herein, a neuron calculator may calculate ordered sets based on the input signals and an order of a respective neuron to provide ordered sets for utilization as a neural network. The ordered sets may be a multiplicative combination of a number of the input signals, with the number of signals determined by an order of the neuron. Accordingly, a $k^{th}$-order neuron may include an ordered set including product values of k input signals, where the input signals are selected from a set of k-combinations with repetition.

Figure 1A:
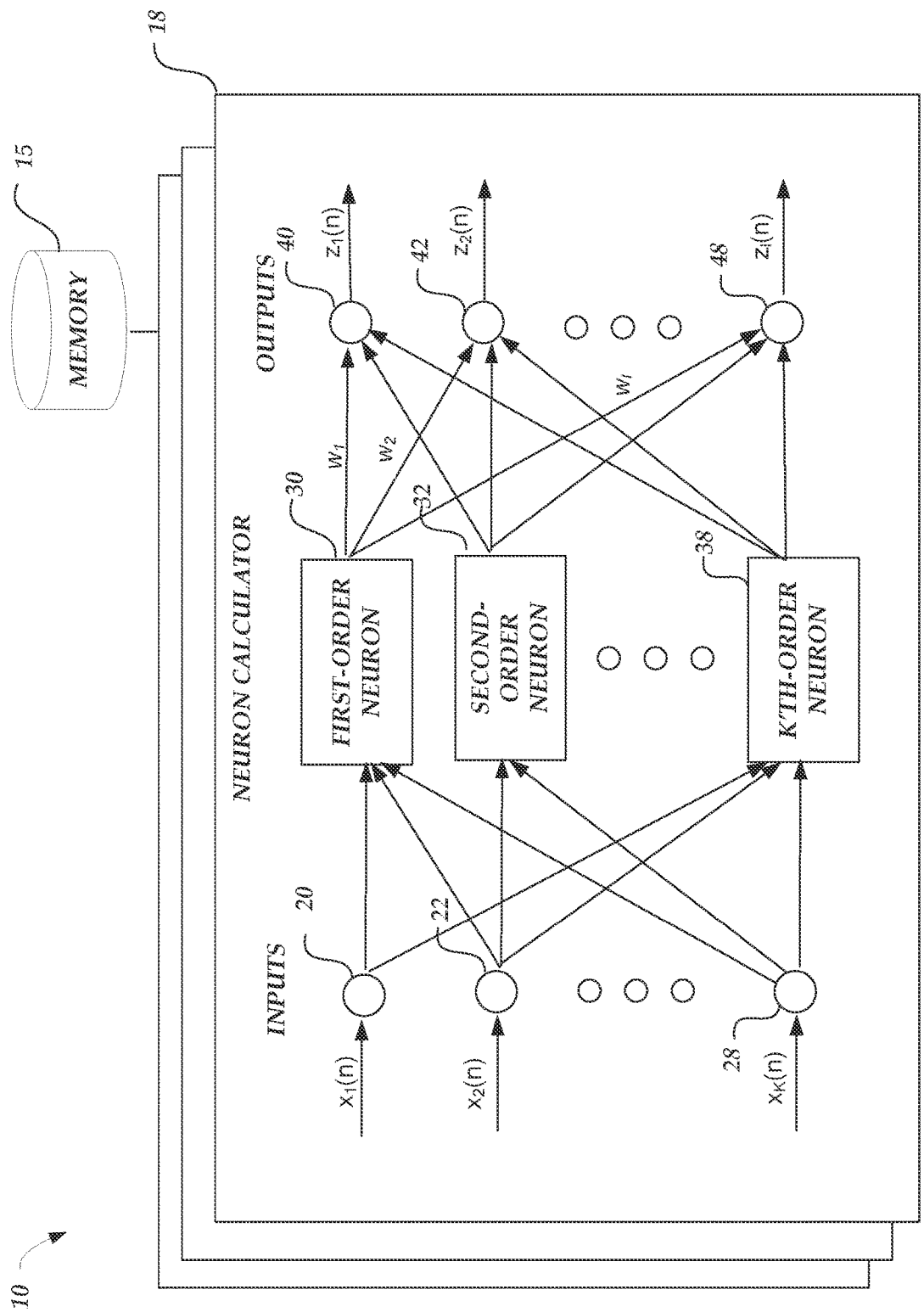
FIG. 1A is a schematic illustration of an example system arranged in accordance with examples described herein.

FIG. 1A is a schematic illustration of an example neural network 10 arranged in accordance with examples described herein. The neural network 10 includes a memory 15 and a neuron calculator 18 with inputs 20, 22, and 28 for input signals $x_1(n)$, $x_2(n)$, $x_k(n)$ respectively and outputs 40, 42, and 48 for output signals $z_1(n)$, $z_2(n)$, $z_j(n)$. The neuron calculator 18 also includes ordered neurons, such as a first-order neuron 30, a second-order neuron 32, and a k'th order neuron 38. The neuron calculator 18 calculates the ordered sets, utilized at the respective ordered neurons 30, 32, and 38, based on the input signals $x_1(n)$, $x_2(n)$, $x_k(n)$. Once calculated, the ordered sets may be stored in memory 15 for further input signals (e.g., additional input signals received at 20, 22, and 28) to adjust and/or compensate such further input signals for an error in the further input signals (e.g., a wireless channel error of a wireless channel). In such an example, the input signals $x_1(n)$, $x_2(n)$, $x_k(n)$ may correspond to inputs for respective antennas of transceivers receiving the respective input signals $x_1(n)$, $x_2(n)$, $x_k(n)$; while the output signals $z_1(n)$, $z_2(n)$, $z_j(n)$ may correspond to compensated signals with a reduced channel estimation error, as compared to the input signals $x_1(n)$, $x_2(n)$, $x_k(n)$.

As described herein, the ordered sets stored in memory 15 to be implemented in respective ordered neurons 30, 32, and 38 may be a multiplicative combination of a number of the input signals, with the number of signals determined by an order of the neuron. Accordingly, for the first-order neuron 30, the first-ordered set comprises $p_i$ elements, where $N_1$ is the number of input signals:

$$p_i^{(1)}(n) = x_i(n) \; (i=1,2,\ldots N_1)$$

As denoted herein, the $^{(1)}$ superscript of a $p_i$ element denotes the order of that element in that ordered set. Accordingly, the $^{(1)}$ superscript indicates a first-order. For the second-order neuron 32, the second-ordered set comprises $p_{ij}$ elements, where $N_i^{(2)}$ and $N_j^{(2)}$ are the number of input signals.

$$p_{ij}^{(2)}(n) = x_i(n)x_j(n) \; (i=1,2,\ldots N_i^{(2)} j=1,2,\ldots N_j^{(2)}).$$

Because the ordered sets are sets of k-combinations with repetition, the total number of the i and j input signals are the same; resulting in a maximum number of second-order elements being $N_i^{(2)} \times N_j^{(2)}$, which equals $N^2$ $p_{ij}$ elements of the second-ordered set to be utilized in the second-order neuron 32. As an example, the neuron calculator 18 may calculate a second-ordered set for three input signals $x_1(n)$, $x_2(n)$, $x_3(n)$ to be $p_{ij}$ elements, as shown in Table 1.

TABLE 1

| | $x_1(n)$ | $x_2(n)$ | $x_3(n)$ |
|---|---|---|---|
| $x_1(n)$ | $p_{11}^{(2)}(n) = x_1^2(n)$ | $p_{12}^{(2)}(n) = x_1(n)x_2(n)$ | $p_{13}^{(2)}(n) = x_1(n)x_3(n)$ |
| $x_2(n)$ | $p_{21}^{(2)}(n) = x_2(n)x_1(n)$ | $p_{22}^{(2)}(n) = x_2^2(n)$ | $p_{23}^{(2)}(n) = x_2(n)x_3(n)$ |
| $x_3(n)$ | $p_{31}^{(2)}(n) = x_3(n)x_1(n)$ | $p_{32}^{(2)}(n) = x_3(n)x_2(n)$ | $p_{33}^{(2)}(n) = x_3^2(n)$ |

In Table 1, six independent elements represent the second-order elements, and, accordingly, may be utilized as the second-ordered set representing nonlinearities of the second-order for the input signals $x_1(n)$, $x_2(n)$, $x_3(n)$. Continuing in the example, for the k'th order neuron 38, the k'th-ordered set comprises $p_{i_1 i_2 \ldots i_k}^{(k)}$ elements:

$$p_{i_2 i_2 \ldots i_k}^{(k)}(n) = x_{i_1}(n)x_{i_2}(n)\ldots x_{i_k}(n).$$

Accordingly, the maximum number of k'th-order elements being $N^k$ elements of the k'th-ordered set to be utilized in the k'th-order neuron 38. As an example, the neuron calculator 18 may calculate a k'th-ordered set for three input signals $x_1(n)$, $x_2(n)$, $x_3(n)$ to be $p_{ijk}$ elements, as shown in Table 2.

TABLE 2

| $p_{111}^{(3)}(n) = x_1^3(n)$ | $p_{221}^{(3)}(n) = x_2^2(n)x_1(n)$ | $p_{331}^{(3)}(n) = x_3^2(n)x_1(n)$ |
|---|---|---|
| $p_{112}^{(3)}(n) = x_1^2(n)x_2(n)$ | $p_{222}^{(3)}(n) = x_2^3(n)$ | $p_{332}^{(3)}(n) = x_3^2(n)x_2(n)$ |
| $p_{113}^{(3)}(n) = x_1^2(n)x_3(n)$ | $p_{223}^{(3)}(n) = x_2^2(n)x_3(n)$ | $p_{333}^{(3)}(n) = x_3^3(n)$ |

$$p_{123}^{(3)}(n) = x_1(n)x_2(n)x_3(n)$$

In Table 2, ten independent elements represent the third-order elements, and, accordingly, may be utilized as the third-ordered set representing nonlinearities of the third-order for the input signals $x_1(n)$, $x_2(n)$, $x_3(n)$.

Again with reference to FIG. 1A, the inputs 20, 22, and 28 of the neuron calculator 18 may be implemented, for example, using bit manipulation units that may forward the input signals $x_1(n)$, $x_2(n)$, $x_k(n)$ to the ordered neurons 30, 32, and 38. The ordered neurons 30, 32, and 38 may be implemented, for example, using multiplication units that include a respective ordered set. In some examples, the respective ordered set may be calculated by neuron calculator 18 in each ordered neuron 30, 32, and 38; and stored in the memory 15. The outputs 40, 42, and 48 may be implemented, for example, using accumulation units that mix (e.g., sum) the respective ordered sets at each of the ordered neurons 30, 32, and 38 with connection weights for each connection between an ordered neuron 30, 32, and 38 and an output 40, 42, and 48. For example, each connection may be weighted with a weight '$W_l$,' where l represents the total number of weights for the connections. In some examples, '$W_l$,' may be a matrix. For example, each connection between the ordered neuron 30, 32, and 38 and the outputs 40, 42, and 48 are weighted. The neuron calculator 18 sums the ordered sets and the connection weights at the outputs 40, 42, and 48 to generate output signals $z_1(n)$, $z_2(n)$, $z_l(n)$. In example, summation at each respective output 40, 42, and 48 may be represented as:

$$z_l(n) = q_l \left( \sum_{i=1}^{N_1} W_l(i) p_i^{(1)}(n) + \sum_{i=1}^{N_i^{(2)}} \sum_{j=1}^{N_j^{(2)}} W_l(i,j) p_{ij}^{(2)}(n) + \ldots + \sum_{i_1=1}^{N_{i_1}^{(k)}} \sum_{i_2=1}^{N_{i_2}^{(k)}} \ldots \sum_{i_k=1}^{N_{i_k}^{(k)}} W_l(i_1, i_1 \ldots i_k) p_{i_1 i_2 \ldots i_k}^{(k)}(n) \right)$$

Equation 1

In Equation 1, l corresponds to each output of each neuron (e.g., neurons 30, 32, and 38), $q_l(\bullet)$ is the activation function of the l'th output of each neuron and $W_l(\bullet)$ is the corresponding connection weight set between the l'th output and the k'th-ordered neuron. Using Equation 1, the connection weights can be determined by the neuron calculator 18. For example, the neuron calculator 18 may utilize a least-mean squares algorithm to determine connection weights. For example, an error, $\epsilon$, may be minimized between calibration signals provided to the neuron calculator 18 and the output signals $z_1(n)$, $z_2(n)$, $z_l(n)$. In the context of Equation 2, $Z(n)$ may be a plurality of calibration signals provided to the neuron calculator 18 at inputs 20, 22, and 28, where M denotes how many calibration signals are provided to the neuron calculator 18.

$$\epsilon = \sum_{n=1}^{M} \|Z(n) - \widehat{Z(n)}\|^2$$

Equation 2

As an example of applying Equation 2 to determine connection weights with calibration signals, a gradient descent method may be utilized to optimize the value of connection weights. For example, connection weights may be initially randomly selected (e.g., all connection weights may equal zero initially). The neuron calculator 18 calculates the outputs 40, 42, and 48 for the calibration signals in accordance with Equation 1. The neuron calculator 18 calculates the error at each of the outputs 40, 42, and 48. The calculated error, $\delta_l(n)$, at each of the outputs 40, 42, and 48, where ordered sets and the connection weights are summed, may be represented by Equation 3; with $z(n)$ being the corresponding output of the neuron calculator 18 (e.g., outputs 40, 42, and 48) of a total number of outputs, L; where $v_l(n)$ is the weighted summation of the l'th neuron of the outputs 40, 42, and 48; and where $[q_l(v_l(n)]'$ is the gradient of the l'th neuron of the outputs 40, 42, and 48.

$$\delta_l(n) = [\hat{z}(n) - z(n)][q_l(v_l(n))]' \; [q_l(v_l(n))]' = \frac{\partial q_l(u)}{\partial u}\bigg|_{u=v_l(n)}$$

Equation 3

Accordingly, the neuron calculator 18 may compute an individual error of each output 40, 42, and 48 after summing the ordered sets and the connection weights at the outputs 40, 42, and 48 to generate output signals $z_1(n)$, $z_2(n)$, $z_l(n)$. As an example of the summation for calculating an error of respective calibration signals, continuing with the denotation of ordered sets and connection weights of Equation 1, the neuron calculator is configured to mix (e.g., sum) at each respective output 40, 42, and 48 the ordered sets and connection weights with the calibration signals $Z(n)$, as expressed in Equation 4.

$$v_l(n) = \sum_{i=1}^{N_1} W_l(i) p_i^{(1)}(n) + \sum_{i=1}^{N_i^{(2)}} \sum_{j=1}^{N_j^{(2)}} W_l(i,j) p_{ij}^{(2)}(n) + \ldots + \sum_{i_1=1}^{N_{i_1}^{(k)}} \sum_{i_2=1}^{N_{i_2}^{(k)}} \ldots \sum_{i_k=1}^{N_{i_k}^{(k)}} W_l(i_1, i_1 \ldots i_k) p_{i_1 i_2 \ldots i_k}^{(k)}(n)$$

Equation 4

Continuing in the example of determining the connection weights, the initial connection weights may be updated according to Equation 5.

$$\Delta W_l(i_1, i_1 \ldots i_k) = \alpha \sum_{n=1}^{M} \delta_l(n) p_{i_1 i_2 \ldots i_k}^{(k)}(n)$$

Equation 5

For example, the neuron calculator 18 may sum the product of the calculated error, $\delta_l(n)$, at each of the outputs 40, 42, and 48, with the elements of each ordered neuron. In accordance with Equation 5, that summation may be multiplied by a learning-rate factor, $\alpha$. In some examples, various sets of M calibration signals may be provided to the neuron calculator 18 to continue updating the connection weights. Once the weights have converged, in accordance with gradient descent methods, the connection weights may be stored in memory 15 for use by the neuron calculator 18 to map various inputs signals to output signals. For example, the neuron calculator 18 may function as a processing component of a wireless transceiver. For example, the neuron calculator 18 may perform channel estimation as a channel estimation processing component of the receiver portion of a wireless transceiver. Accordingly, in the context of a neuron calculator 18 being a channel estimation processing component, the neuron calculator 18 may include ordered sets and connection weights that, when applied to a wireless input signal, remove or reduce an error introduced by a wireless channel. In various examples, a neuron calculator 18 or several neuron calculators may operate in conjunction with a wireless transceiver to perform various wireless processing component functionalities.

The neuron calculator 18 can be implemented using one or more processing units, for example, having any number of cores. An example processing unit can include an arithmetic logic unit (ALU), a bit manipulation unit, a multiplication unit, an accumulation unit, an adder unit, a look-up table unit, a memory look-up unit, or any combination thereof. For example, a processing unit 58 is described with reference to FIG. 1B including multiplication units, accumulation units, and, memory look-up units.

In an example processor core, a set of instructions can be loaded that implements calculations performed by the neuron calculator 18. In some examples, the neuron calculator 18 may include circuitry, including custom circuitry, and/or firmware for performing functions described herein. For example, circuitry can include multiplication unit, accumulation units, and/or bit manipulation units for performing the described functions, as described herein. The neuron calculator 18 may be implemented in any type of processor architecture including but not limited to a microprocessor or a digital signal processor (DSP), or any combination thereof. In an example processor core, a set of instructions can be loaded that implements the training of the neuron calculator 18 being provided calibration signals, e.g., training the neuron calculator 18 to determine the elements of the ordered sets and the connection weights.

In FIG. 1A, the neuron calculator 18 has been described with respect to a single layer of ordered neurons 30, 32, and 38, with a layer being an intermediate connection node between the inputs 20, 22, and 28 and the outputs 40, 42, and 48. For example, each ordered neuron 30, 32, and 38 is an individual multiplication unit. It can be appreciated that additional layers of ordered neurons with multiplication units may be added between the inputs 20, 22, and 28 and the outputs 40, 42, and 48. For example—in an embodiment in which additional neurons are included between the inputs 20, 22, and 28 and the ordered neurons 30, 32, and 38—the ordered neurons 30, 32, and 38 may represent a last layer of neuron calculator 18 having several layers of ordered neurons. In such a case, Equation 1 may represent a summation at each respective output 40, 42, and 48 of this last layer of the neuron calculator 18. The neuron calculator 18 may be scalable in hardware form, with additional multiplication units being added to accommodate additional layers.

Figure 1B:
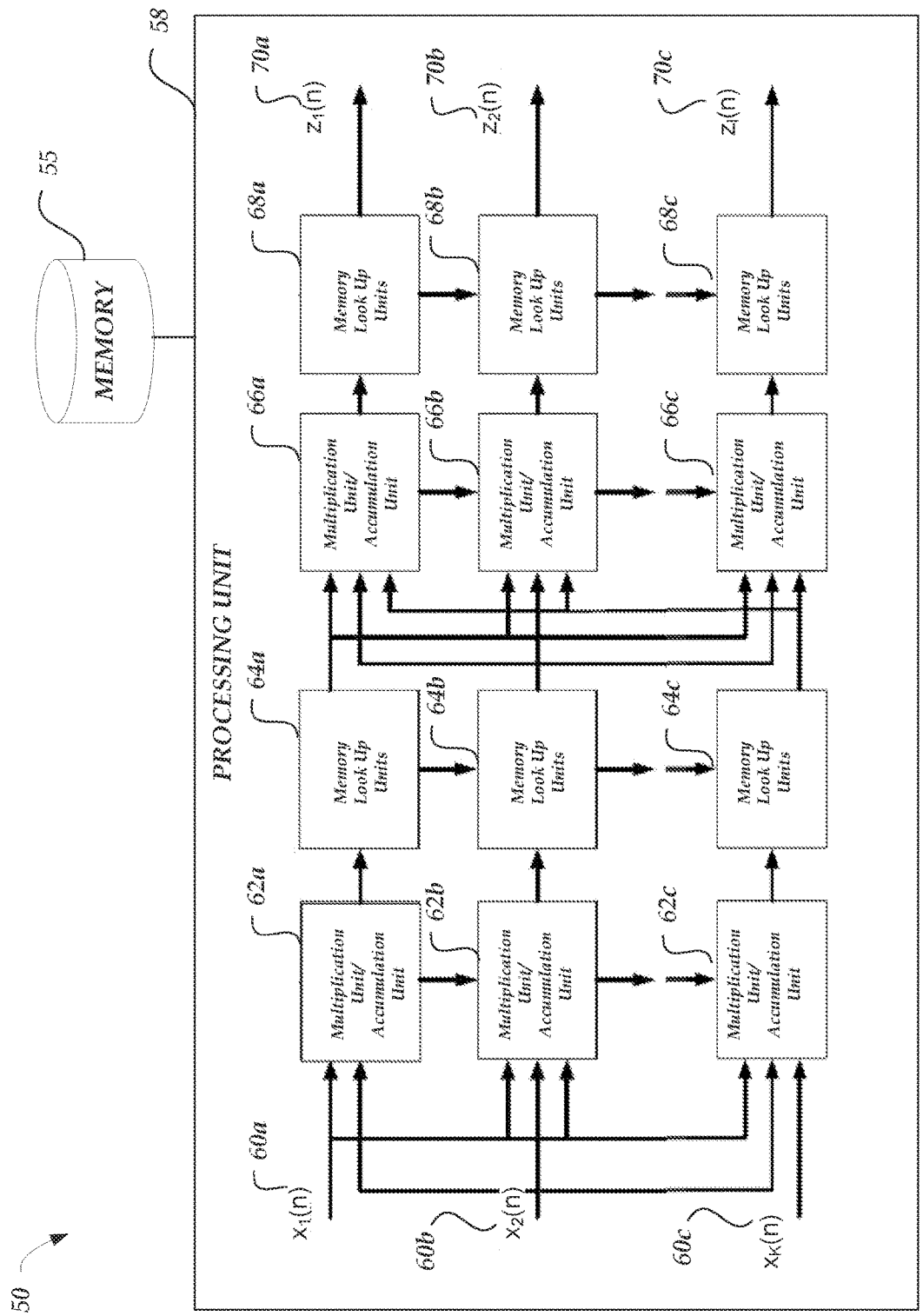
FIG. 1B is a schematic illustration of an example processing unit arranged in accordance with examples described herein.

FIG. 1B is a block diagram of a processing unit 58 in a neural network 50, which may be implemented as a neuron calculator 18, in accordance with examples described herein. The processing unit 58 may receive input signals $x_1(n)$, $x_2(n)$, $x_k(n)$ (e.g. $X(n)$) 60*a-c* for processing, e.g., as a component of a MIMO wireless transceiver. The processing unit 58 may include multiplication unit/accumulation units 62*a-c*, 66*a-c* and memory lookup units 64*a-c*, 68*a-c* that, when mixed with input signals, may generate output signals $z_1(n)$, $z_2(n)$, $z_l(n)$ (e.g. $Z(n)$)) 70*a-c*. In some examples, the output signals (e.g. $Z(n)$) 70*a-c* may be utilized as the output of a component of the MIMO wireless transceiver. The processing unit 58, may be provided instructions to cause the processing unit 58 to configure the multiplication units 62*a-c* to multiply input signals 60*a-c* with ordered sets of respective ordered neurons and connections weights to generate multiplication processing result to be summed. The accumulation units 66*a-c* are configured to the product values to generate the output signals 70*a-c*.

The multiplication unit/accumulation units 62*a-c*, 66*a-c* multiply two operands from the input signals 60*a-c* to generate a multiplication processing result that is accumulated by the accumulation unit portion of the multiplication unit/accumulation units 62*a-c*, 66*a-c*. The multiplication unit/accumulation units 62*a-c*, 66*a-c* adds the multiplication processing result to update the processing result stored in the accumulation unit portion, thereby accumulating the multiplication processing result. For example, the multiplication unit/accumulation units 62*a-c*, 66*a-c* may perform a multiply-accumulate operation such that two operands, M and N, are multiplied and then added with P to generate a new version of P that is stored in its respective multiplication unit/accumulation units.

The memory look-up units 64*a-c*, 68*a-c* retrieve ordered sets of ordered neurons and/or connections weights stored in memory 55. The output of the memory look-up units 64*a-c*, 68*a-c* is provided to the multiplication unit/accumulation units 62a-c, 66a c that may be utilized as a multiplication operand in the multiplication unit portion of the multiplication unit/accumulation units 62a-c, 66a-c. For example, the memory look-up unit can be a table look-up that retrieves a specific plurality of connection weights associated with that respective ordered neuron. As described herein, the neuron calculator 18 may calculate, dynamically, the ordered sets of the ordered neurons based on the input signals 60a-c to be used as part of the multiply-accumulate operation. In some examples, the calculated ordered sets may be stored in the memory 55 and retrieved by the memory look-up units 64a-c, 68a-c. Or the calculated ordered sets may be utilized in the multiply-accumulate operation, once calculated, as part of generating the output signals 70a-c. For example, the input signals 60a-c may be used to calculate respective ordered sets, e.g., inputs signals for a second-order neuron comprises second-order $p_{ij}$ elements as described above with respect to FIG. 1A. Accordingly, in various examples of calculating ordered sets, the circuitry arrangement of FIG. 1B may utilized to generate the output signals (e.g. Z(n)) 70a-c from the input signals (e.g. X(n)) 60a-c.

Each of the multiplication unit/accumulation units 62a-c, 66a-c may include multiple multipliers, multiple accumulation unit, or and/or multiple adders. Any one of the multiplication unit/accumulation units 62a-c, 66a-c may be implemented using an ALU. In some examples, any one of the multiplication unit/accumulation units 62a-c, 66a-c can include one multiplier and one adder that each perform, respectively, multiple multiplications and multiple additions. The input-output relationship of a multiplication/accumulation unit 62a-c, 66a-c may be represented as:

$$B_{out} = \sum_{i=1}^{I} C_i * B_m(i) \quad (6)$$

where "I" represents a number to perform the multiplications in that unit, $C_i$ the coefficients which may be accessed from a memory, such as memory 55, and $B_{in}(i)$ represents a factor from either the input data X(n) 60a-c or an output from multiplication unit/accumulation units 62a-c, 66a-c. In an example, the output of a set of multiplication unit/accumulation units, $B_{out}$, equals the sum of coefficient data, $C_i$ multiplied by the output of another set of multiplication unit/accumulation units, $B_{in}(i)$. $B_{in}(i)$ may also be the input data such that the output of a set of multiplication unit/accumulation units, $B_{out}$, equals the sum of coefficient data, $C_i$ multiplied by input data.

Figure 2:
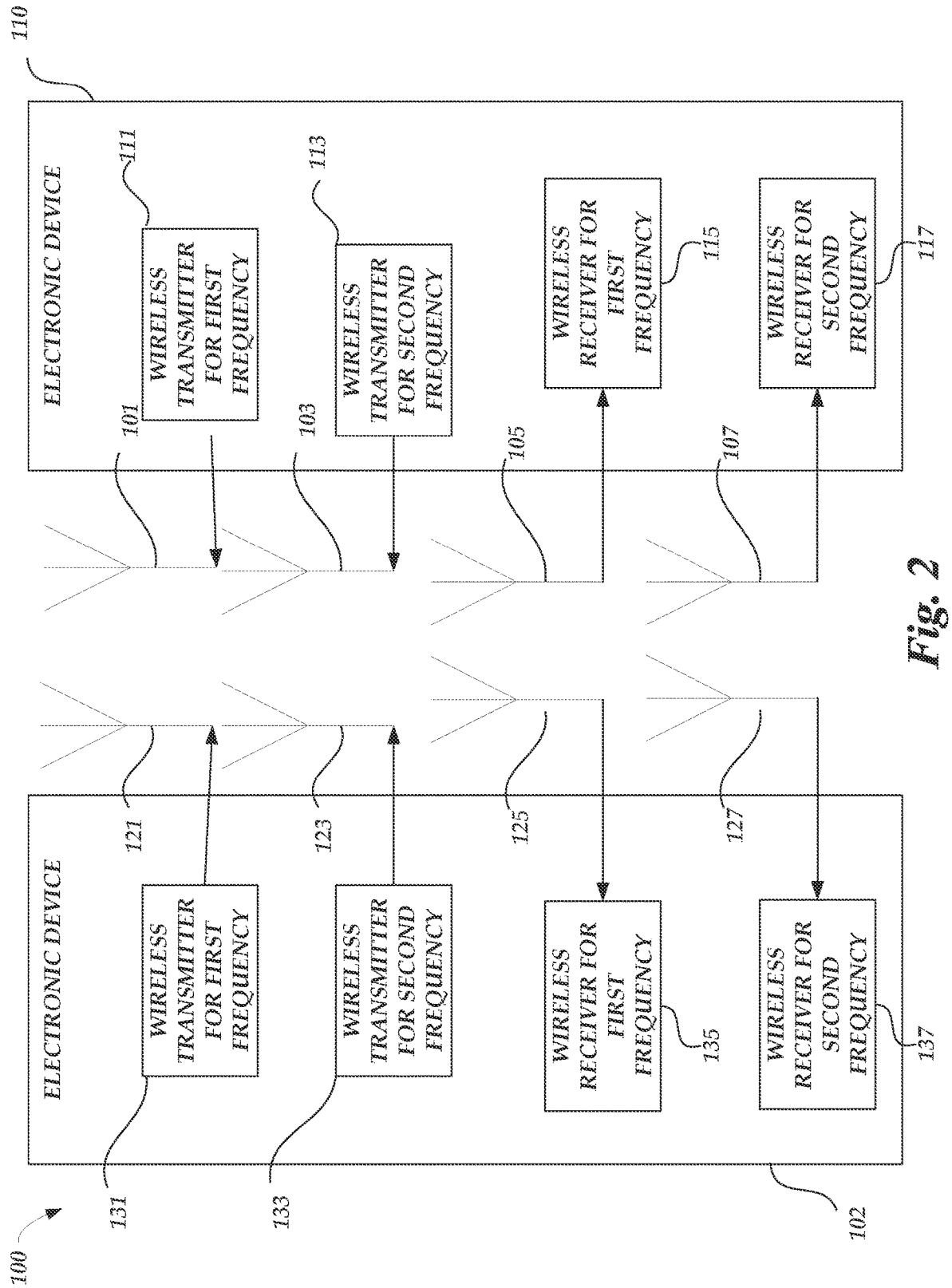
FIG. 2 is a schematic illustration of a system arranged in accordance with examples described herein.

FIG. 2 is a schematic illustration of a system arranged in accordance with examples described herein. System 100 includes electronic device 102, electronic device 110, antenna 101, antenna 103, antenna 105, antenna 107, antenna 121, antenna 123, antenna 125, antenna 127, wireless transmitter 131, wireless transmitter 133, wireless receiver 135 and, wireless receiver 137. Antennas 101, 103, 105, 107, 121, 123, 125, and 127 may be dynamically tuned to different frequencies or bands, in some examples. The electronic device 102 may include antenna 121 associated with a first frequency, antenna 123 associated with a second frequency, antenna 125 associated with the first frequency, antenna 127 associated with the second frequency, wireless transmitter 131 for the first frequency, wireless transmitter 133 for the second frequency, wireless receiver 135 for the first frequency, and wireless receiver 137 the second frequency. The electronic device 110 may include the antenna 101 associated with the first frequency, antenna 103 associated with the second frequency, antenna 105 associated with the first frequency, antenna 107 associated with the second frequency, wireless transmitter 111 for the first frequency, wireless transmitter 113 for the second frequency, wireless receiver 115 for the first frequency, and wireless receiver 117 for the second frequency.

Electronic devices 102, 110 may include a neural network 10. For example, wireless transmitter 131 and wireless receiver 135 may include in combination a neural network 10, each having a neuron calculator 18 incorporated as part of at least on component of the respective transmitter 131 or receiver 135. In operation, the neuron calculators 18 may calculate ordered sets and provide output signals for one or more components of the transmitter 131 or the receiver 135. In an example, the wireless transmitter 133 may include a neural network 10 with several neuron calculators 18 or a single neuron calculator 18. In operation, the neuron calculator(s) 18 of the transmitter 133 may calculate ordered sets and provide output signals for one or more components of the transmitter 133. As can be appreciated, and as additionally described with respect to FIG. 5 for a MIMO transceiver application, neuron calculators 18 may be implemented in various portions of electronic devices 102, 110, as individual components of certain aspects of the electronic devices or working together in a neural network 10 including various neuron calculators 18.

Electronic devices described herein, such as electronic device 102 and electronic device 110 shown in FIG. 2 may be implemented using generally any electronic device for which communication capability is desired. For example, electronic device 102 and/or electronic device 110 may be implemented using a mobile phone, smartwatch, computer (e.g. server, laptop, tablet, desktop), or radio. In some examples, the electronic device 102 and/or electronic device 110 may be incorporated into and/or in communication with other apparatuses for which communication capability is desired, such as but not limited to, a wearable device, a medical device, an automobile, airplane, helicopter, appliance, tag, camera, or other device.

While not explicitly shown in FIG. 2, electronic device 102 and/or electronic device 110 may include any of a variety of components in some examples, including, but not limited to, memory, input/output devices, circuitry, processing units (e.g. processing elements and/or processors), or combinations thereof.

The electronic device 102 and the electronic device 110 may each include multiple antennas. For example, the electronic device 102 and electronic device 110 may each have more than two antennas. Three antennas each are shown in FIG. 2, but generally any number of antennas may be used including 2, 3, 4, 5, 6, 7, 8, 9, 10, 11, 12, 13, 14, 15, 16, 32, or 64 antennas. Other numbers of antennas may be used in other examples. In some examples, the electronic device 102 and electronic device 110 may have a same number of antennas, as shown in FIG. 2. In other examples, the electronic device 102 and electronic device 110 may have different numbers of antennas.

Generally, systems described herein may include multiple-input, multiple-output ("MIMO") systems. MIMO systems generally refer to systems including one or more electronic devices which transmit transmissions using multiple antennas and one or more electronic devices which receive transmissions using multiple antennas. In some examples, electronic devices may both transmit and receive transmissions using multiple antennas. Some example systems described herein may be "massive MIMO" systems. Generally, massive MIMO systems refer to systems employing greater than a certain number (e.g. 16) antennas to transmit and/or receive transmissions. As the number of antennas increase, so generally does the complexity involved in accurately transmitting and/or receiving transmissions.

Although two electronic devices (e.g. electronic device 102 and electronic device 110) are shown in FIG. 2, generally the system 100 may include any number of electronic devices.

Electronic devices described herein may include receivers, transmitters, and/or transceivers. For example, the electronic device 102 of FIG. 2 includes wireless transmitter 131 and wireless receiver 135, and the electronic device 110 includes wireless transmitter 111 and wireless receiver 115. Generally, receivers may be provided for receiving transmissions from one or more connected antennas, transmitters may be provided for transmitting transmissions from one or more connected antennas, and transceivers may be provided for receiving and transmitting transmissions from one or more connected antennas. While both electronic devices 102, 110 are depicted in FIG. 2 with individual wireless transmitter and individual wireless receivers, it can be appreciated that a wireless transceiver may be coupled to antennas of the electronic device and operate as either a wireless transmitter or wireless receiver, to receive and transmit transmissions. For example, a transceiver of electronic device 102 may be used to provide transmissions to and/or receive transmissions from antennas 121 and 123, while other transceivers of electronic device 110 may be used to provide transmissions to and/or receive transmissions from antenna 101 and antenna 103.

Generally, multiple receivers, transmitters, and/or transceivers may be provided in an electronic device—one in communication with each of the antennas of the electronic device. The transmissions may be in accordance with any of a variety of protocols, including, but not limited to 5G signals, and/or a variety of modulation/demodulation schemes may be used, including, but not limited to: orthogonal frequency division multiplexing (OFDM), filter bank multi-carrier (FBMC), the generalized frequency division multiplexing (GFDM), universal filtered multi-carrier (UFMC) transmission, bi orthogonal frequency division multiplexing (BFDM), sparse code multiple access (SCMA), non-orthogonal multiple access (NOMA), multi-user shared access (MUSA) and faster-than-Nyquist (FTN) signaling with time-frequency packing. In some examples, the transmissions may be sent, received, or both, in accordance with various protocols and/or standards (e.g., NR, LTE, WiFi, etc.).

Examples of transmitters, receivers, and/or transceivers described herein, such as the wireless transmitter 131, wireless transmitter 133, wireless receiver 115, or wireless receiver 117, may be implemented using a variety of components, including, hardware, software, firmware, or combinations thereof. For example, transceivers, transmitters, or receivers may include circuitry and/or one or more processing units (e.g. processors) and memory encoded with executable instructions for causing the transceiver to perform one or more functions described herein (e.g. software).

Figure 3:
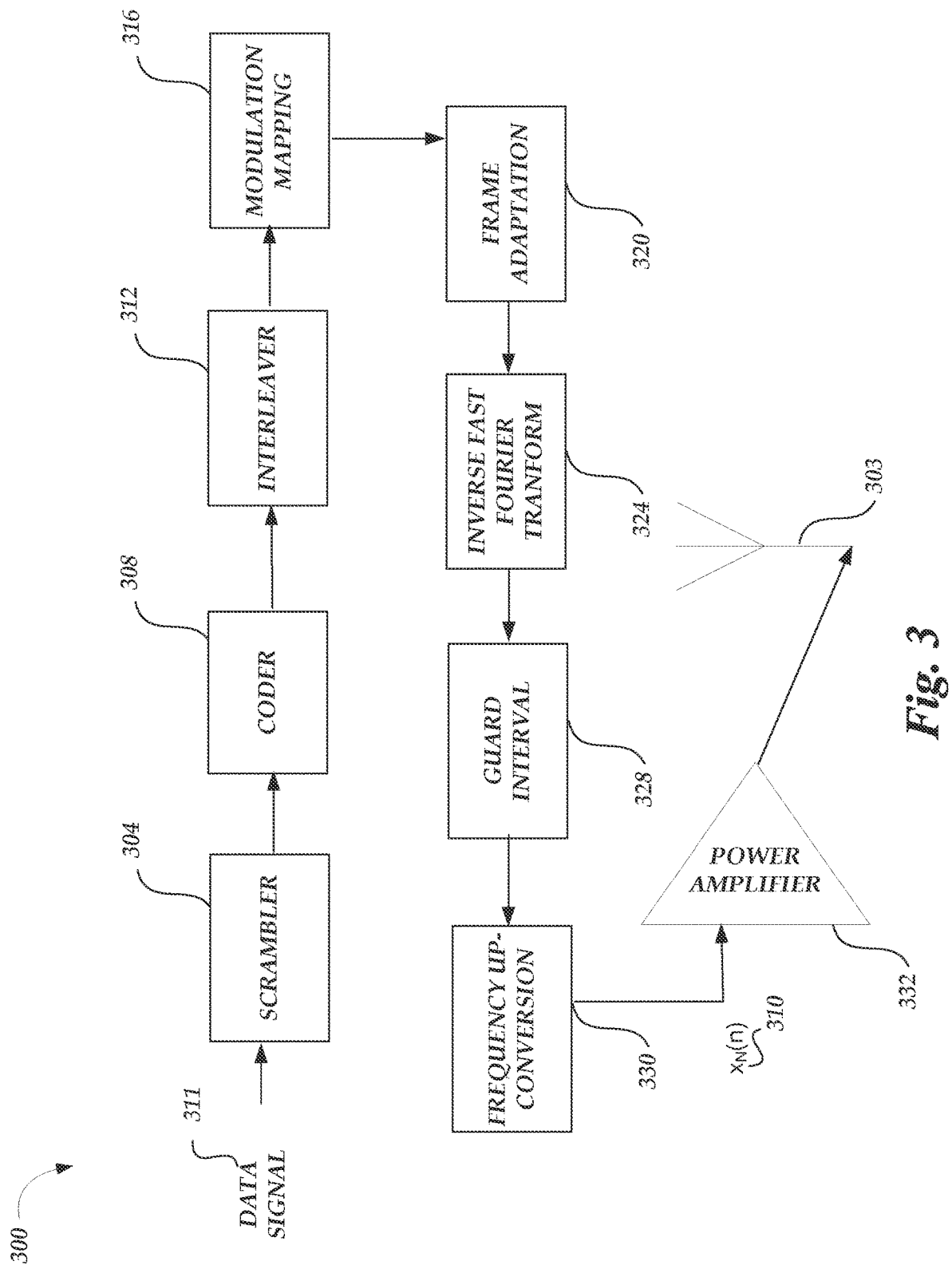
FIG. 3 is a schematic illustration of a wireless transmitter.

FIG. 3 is a schematic illustration of a wireless transmitter 300. The wireless transmitter 300 receives a data signal 311 and performs operations to generate wireless communication signals for transmission via the antenna 303. The wireless transmitter 300 may be utilized to implement the wireless transmitters 111, 113, 131, 133 of FIG. 2, for example. The transmitter output signal $x_N(n)$ 310 is amplified by a power amplifier 332 before the output data are transmitted on an RF antenna 303. The operations to the RF-front end may generally be performed with analog circuitry or processed as a digital baseband operation for implementation of a digital front-end. The operations of the baseband and RF-front end include a scrambler 304, a coder 308, an interleaver 312, a modulation mapping 316, a frame adaptation 320, an inverse fast Fourier transform (IFFT) logic 324, a guard interval 328, and frequency up-conversion 330.

The scrambler 304 may convert the input data to a pseudo-random or random binary sequence. For example, the input data may be a transport layer source (such as MPEG-2 Transport stream and other data) that is converted to a Pseudo Random Binary Sequence (PRBS) with a generator polynomial. While described in the example of a generator polynomial, various scramblers 304 are possible.

The coder 308 may encode the data outputted from the scrambler to code the data. For example, a Reed-Solomon (RS) encoder, turbo encoder may be used as a first coder to generate a parity block for each randomized transport packet fed by the scrambler 304. In some examples, the length of parity block and the transport packet can vary according to various wireless protocols. The interleaver 312 may interleave the parity blocks output by the coder 308, for example, the interleaver 312 may utilize convolutional byte interleaving. In some examples, additional coding and interleaving can be performed after the coder 308 and interleaver 312. For example, additional coding may include a second coder that may further code data output from the interleaver, for example, with a punctured convolutional coding having a certain constraint length. Additional interleaving may include an inner interleaver that forms groups of joined blocks. While described in the context of a RS coding, turbo coding, and punctured convolution coding, various coders 308 are possible, such as a low-density parity-check (LDPC) coder or a polar coder. While described in the context of convolutional byte interleaving, various interleavers 312 are possible.

The modulation mapping 316 may modulate the data output from the interleaver 312. For example, quadrature amplitude modulation (QAM) may be used to map the data by changing (e.g., modulating) the amplitude of the related carriers. Various modulation mappings may be used, including, but not limited to: Quadrature Phase Shift Keying (QPSK), SCMA, NOMA, and MUSA (Multi-user Shared Access). Output from the modulation mapping 316 may be referred to as data symbols. While described in the context of QAM modulation, various modulation mappings 316 are possible. The frame adaptation 320 may arrange the output from the modulation mapping according to bit sequences that represent corresponding modulation symbols, carriers, and frames.

The IFFT logic 324 may be a processor and/or a computer-readable media implementing instructions to execute an inverse fast Fourier transform. For example, the IFFT logic 324 may transform symbols that have been framed into sub-carriers (e.g., by frame adaptation 320) into time-domain symbols. Taking an example of a 5G wireless protocol scheme, the IFFT can be applied as N-point IFFT:

$$x_k = \sum_{n=1}^{N} X_n e^{i2\pi kn/N} \tag{7}$$

where $X_n$ is the modulated symbol sent in the nth 5G sub-carrier. Accordingly, the output of the IFFT logic 324 may form time-domain 5G symbols. In some examples, the IFFT of the logic 324 may be replaced by a pulse shaping filter or poly-phase filtering banks to output symbols for frequency up-conversion 330. For example, the processor and/or the computer-readable media implementing instructions to execute an inverse fast Fourier transform may be changed or updated to implement a pulse shaping filter or poly-phase filtering banks.

In the example of FIG. 3, the guard interval 328 adds a guard interval to the time-domain 5G symbols. For example, the guard interval may be a fractional length of a symbol duration that is added, to reduce inter-symbol interference, by repeating a portion of the end of a time-domain 5G symbol at the beginning of the frame. For example, the guard interval can be a time period corresponding to the cyclic prefix portion of the 5G wireless protocol scheme.

The frequency up-conversion 330 may up-convert the time-domain 5G symbols to a specific radio frequency. For example, the time-domain 5G symbols can be viewed as a baseband frequency range and a local oscillator can mix the frequency at which it oscillates with the 5G symbols to generate 5G symbols at the oscillation frequency. A digital up-converter (DUC) may also be utilized to convert the time-domain 5G symbols. Accordingly, the 5G symbols can be up-converted to a specific radio frequency for an RF transmission.

Before transmission, at the antenna 303, a power amplifier 332 may amplify the transmitter output signal $x_N(n)$ 310 to output data for an RF transmission in an RF domain at the antenna 303. The antenna 303 may be an antenna designed to radiate at a specific radio frequency. For example, the antenna 303 may radiate at the frequency at which the 5G symbols were up-converted. Accordingly, the wireless transmitter 300 may transmit an RF transmission via the antenna 303 based on the data signal 311 received at the scrambler 304.

As described above with respect to FIG. 3, the operations of the wireless transmitter 300 can include a variety of processing operations. Such operations can be implemented in a conventional wireless transmitter, with each operation implemented by specifically-designed hardware for that respective operation. For example, a DSP processing unit may be specifically-designed to implement the guard interval 328. As described in examples herein, a neural calculator 18 may be included in a wireless transmitter 300 to perform one or more of the processing operations/components. Accordingly, a neural calculator 18 may implement the guard interval 328. As can be appreciated, additional operations of wireless transmitter 300 may be included in a conventional wireless transmitter, which are not depicted in FIG. 3 (e.g., an digital-to-analog converter (DAC)), but are also operations that a neural calculator 18 may implement.

Figure 4:
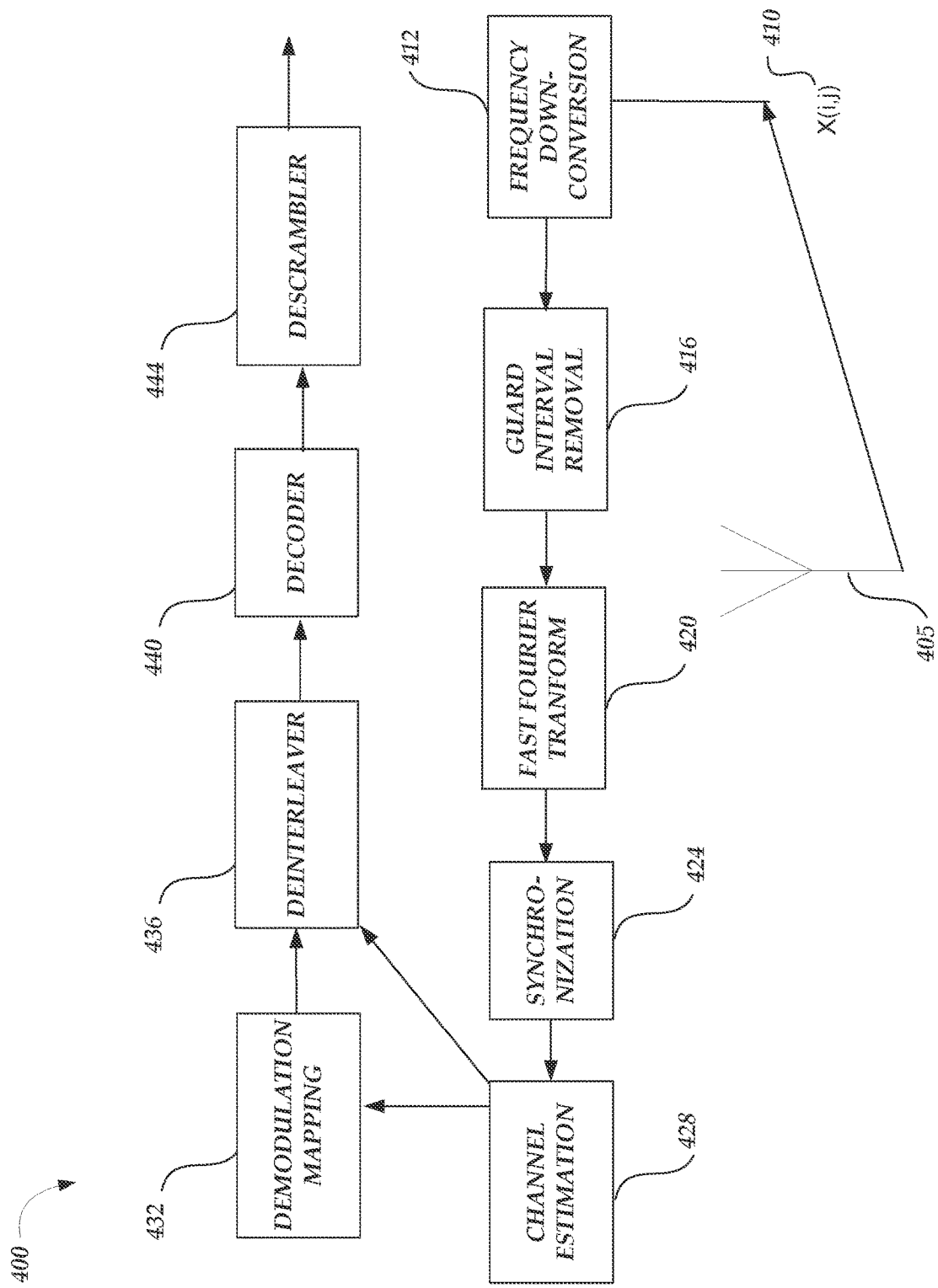
FIG. 4 is a schematic illustration of wireless receiver.

FIG. 4 is a schematic illustration of wireless receiver 400. The wireless receiver 400 receives input data X (i,j) 410 from an antenna 405 and performs operations of a wireless receiver to generate receiver output data at the descrambler 444. The wireless receiver 400 may be utilized to implement the wireless receivers 115, 117, 135, 137 of FIG. 2, for example. The antenna 405 may be an antenna designed to receive at a specific radio frequency. The operations of the wireless receiver may be performed with analog circuitry or processed as a digital baseband operation for implementation of a digital front-end. The operations of the wireless receiver include a frequency down-conversion 412, guard interval removal 416, a fast Fourier transform (FFT) logic 420, synchronization 424, channel estimation 428, a demodulation mapping 432, a deinterleaver 436, a decoder 440, and a descrambler 444.

The frequency down-conversion 412 may down-convert the frequency domain symbols to a baseband processing range. For example, continuing in the example of a 5G implementation, the frequency-domain 5G symbols may be mixed with a local oscillator frequency to generate 5G symbols at a baseband frequency range. A digital down-converter (DDC) may also be utilized to convert the frequency domain symbols. Accordingly, the RF transmission including time-domain 5G symbols may be down-converted to baseband. The guard interval removal 416 may remove a guard interval from the frequency-domain 5G symbols.

The FFT logic 420 may be a processor and/or a computer-readable media implementing instructions to execute a fast Fourier transform. For example, the FFT logic 420 may transform the time-domain 5G symbols into frequency-domain 5G symbols. Taking an example of a 5G wireless protocol scheme, the FFT can be applied as N-point FFT:

$$X_n = \sum_{k=1}^{N} x_k e^{-i2\pi kn/N} \tag{8}$$

where $X_n$ is the modulated symbol sent in the nth 5G sub-carrier. Accordingly, the output of the FFT logic 420 may form frequency-domain 5G symbols. In some examples, the FFT of the logic 420 may be replaced by poly-phase filtering banks to output symbols for synchronization 424. For example, the processor and/or the computer-readable media implementing instructions to execute a fast Fourier transform may be changed or updated to implement poly-phase filtering banks.

The synchronization 424 may detect pilot symbols in the 5G symbols to synchronize the transmitted data. In some examples of a 5G implementation, pilot symbols may be detected at the beginning of a frame (e.g., in a header) in the time-domain. Such symbols can be used by the wireless receiver 400 for frame synchronization. With the frames synchronized, the 5G symbols proceed to channel estimation 428. The channel estimation 428 may also use the time-domain pilot symbols and additional frequency-domain pilot symbols to estimate the time or frequency effects (e.g., path loss) to the received signal.

For example, a channel may be estimated according to N signals received through M antennas (in addition to the antenna 405) in a preamble period of each signal. In some examples, the channel estimation 428 may also use the guard interval that was removed at the guard interval removal 416. With the channel estimate processing, the channel estimation 428 may compensate for the frequency-domain 5G symbols by some factor to minimize the effects of the estimated channel. While channel estimation has been described in terms of time-domain pilot symbols and frequency-domain pilot symbols, other channel estimation techniques or systems are possible, such as a MIMO-based channel estimation system or a frequency-domain equalization system.

The demodulation mapping 432 may demodulate the data outputted from the channel estimation 428. For example, a quadrature amplitude modulation (QAM) demodulator can map the data by changing (e.g., modulating) the amplitude of the related carriers. Any modulation mapping described herein can have a corresponding demodulation mapping as performed by demodulation mapping 432. In some examples, the demodulation mapping 432 may detect the phase of the carrier signal to facilitate the demodulation of the 5G symbols. The demodulation mapping 432 may generate bit data from the 5G symbols to be further processed by the deinterleaver 436.

The deinterleaver 436 may deinterleave the data bits, arranged as parity block from demodulation mapping into a bit stream for the decoder 440, for example, the deinterleaver 436 may perform an inverse operation to convolutional byte interleaving. The deinterleaver 436 may also use the channel estimation to compensate for channel effects to the parity blocks.

The decoder 440 may decode the data outputted from the scrambler to code the data. For example, a Reed-Solomon (RS) decoder or turbo decoder may be used as a decoder to generate a decoded bit stream for the descrambler 444. For example, a turbo decoder may implement a parallel concatenated decoding scheme. In some examples, additional decoding and/or deinterleaving may be performed after the decoder 440 and deinterleaver 436. For example, additional decoding may include another decoder that may further decode data output from the decoder 440. While described in the context of a RS decoding and turbo decoding, various decoders 440 are possible, such as low-density parity-check (LDPC) decoder or a polar decoder.

The descrambler 444 may convert the output data from decoder 440 from a pseudo-random or random binary sequence to original source data. For example, the descrambler 44 may convert decoded data to a transport layer destination (e.g., MPEG-2 transport stream) that is descrambled with an inverse to the generator polynomial of the scrambler 304. The descrambler thus outputs receiver output data. Accordingly, the wireless receiver 400 receives an RF transmission including input data X (ij) 410 via to generate the receiver output data.

As described herein, for example with respect to FIG. 4, the operations of the wireless receiver 400 can include a variety of processing operations. Such operations can be implemented in a conventional wireless receiver, with each operation implemented by specifically-designed hardware for that respective operation. For example, a DSP processing unit may be specifically-designed to implement the FFT 420. As described in examples herein, a neural calculator 18 may be included in a wireless receiver 400 to perform one or more of the processing operations/components. Accordingly, a neural calculator 18 may implement the FFT 420. As can be appreciated, additional operations of wireless receiver 400 may be included in a conventional wireless receiver, which are not depicted in FIG. 4 (e.g., an analog-to-digital converter (ADC)), but are also operations that a neural calculator 18 may implement.

Figure 5:
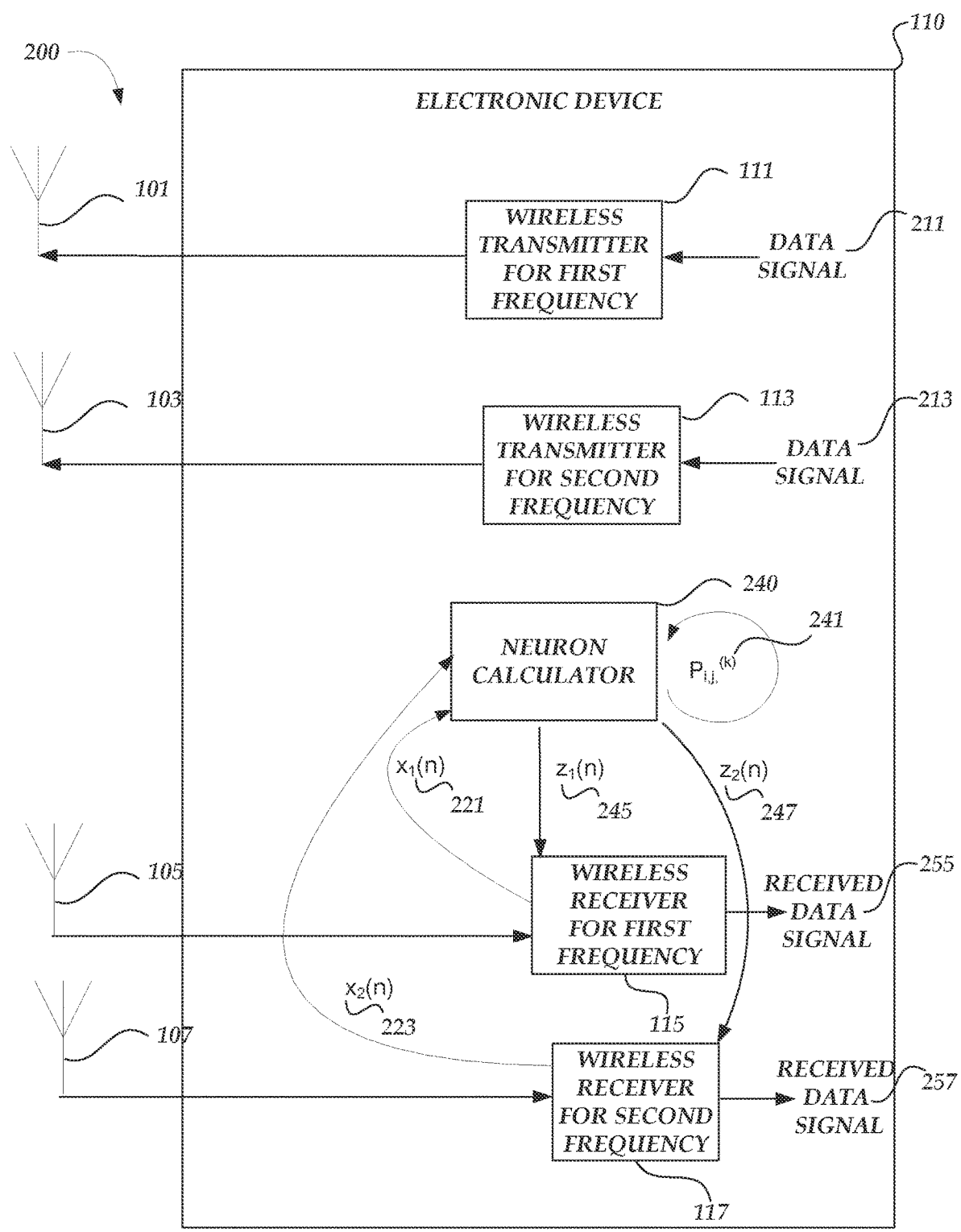
FIG. 5 is a schematic illustration of an electronic device arranged in accordance with examples described herein.

FIG. 5 is a schematic illustration 200 of an electronic device 110 arranged in accordance with examples described herein. Similarly, numbered elements of FIG. 5 include analogous functionality to those numbered elements of FIG. 2. The electronic device 110 may also include a neuron calculator 240, which may be the neuron calculator 18. Each wireless transmitter 111, 113 may be in communication with a respective antenna, such as antenna 101, antenna 103. Each wireless transmitter 111, 113 receives a respective data signal, such as data signals 211, 213. The wireless transmitter 113 may process the data signal 213 with the operations of a wireless transmitter (e.g., transmitter 300) to generate a transmission signal (e.g., output signal $x_N(n)$ 310). Each wireless receiver 115, 117 may be in communication with a respective antenna, such as antenna 105, antenna 107. Each wireless receiver 115, 117 receives respective signals from the antennas 105, 107; and may process signals with the operations of a wireless receiver (e.g., wireless receiver 400) to generate received output signals 255, 257.

During processing of the signals received from the antennas 105, 107, the wireless receivers 115, 117 may provide input signals $x_1(n)$, $x_2(n)$ 221, 223 to the neuron calculator 240. For example, the input signals $x_1(n)$, $x_2(n)$ 221, 223 may be provided to the neuron calculator 240 via internal paths from an output of the wireless receiver 115 and an output of the wireless receiver 117. Accordingly, paths stemming from the wireless receivers 115, 117 and the neuron calculator 240 may be in communication with one another. The neuron calculator 240, therefore, receives a first signal $x_1(n)$ 221 associated with the wireless receiver 115 and a second signal $x_2(n)$ 223 associated with the wireless receiver 117.

Examples of neuron calculators described herein may generate and provide output signals $z_1(n)$, $z_2(n)$ 245, 247 to wireless receivers 245, 247. In generating such output signals, the neuron calculator may calculate elements of ordered sets $p_{i,j}^{(k)}$ 241. For example, as described with reference to FIG. 1A, various ordered sets may be calculated based on the input signals $x_1(n)$, $x_2(n)$ 221, 223. In some examples where the inputs signals are calibration signals, the neuron calculator 240 may also determine connection weights in accordance with Equation 1-5. So, for example, the neuron calculator 240 may generate and store connection weights in a local memory of the electronic device 110 and using such weights may provide output signals $z_1(n)$, $z_2(n)$ 245, 247 to wireless receivers 115, 117. Continuing in an example of the neuron calculator 18 having been provided the input signals $x_1(n)$, $x_2(n)$ 221, 223, the neuron calculator 18 may be configured to perform a functionality of the wireless receivers 115, 117. For example, the neuron calculator 240 may perform a channel estimation (e.g., channel estimation 428) for the wireless receivers 115, 117 on the input signals $x_1(n)$, $x_2(n)$ 221, 223 to provide output signals $z_1(n)$, $z_2(n)$ 245, 247 with a removed or reduced error introduced by a wireless channel(s) (e.g., wireless channels associated with the first and second frequencies). The neuron calculator 240 may mix the input signals $x_1(n)$, $x_2(n)$ 221, 223 with the ordered sets of ordered neurons and connection weights to calculate the output signals $z_1(n)$, $z_2(n)$ 245, 247. In the example, the neuron calculator 240 may receive the input signals $x_1(n)$, $x_2(n)$ 221, 223 as symbols from the wireless receivers 115, 117; and, thus, provide output signals $z_1(n)$, $z_2(n)$ 245, 247 that may be referred to as compensated symbols. For example, the output signals may be compensated because a channel error present in the signals $x_1(n)$, $x_2(n)$ 221, 223 has been removed or reduced.

While FIG. 5 depicts neuron calculator 240 operating on signals from the wireless receivers 115, 117 at a channel estimation stage/component of the wireless receiver stage, it can be appreciated that various signals, whether amplified, modulated, or initial, may be provided to a neuron calculator 18, such as neuron calculator 240, to perform a functionality of one or more processing stages of the wireless receivers 115, 117. For example, in an embodiment, a neuron calculator may receive each of the input signals $x_1(n)$, $x_2(n)$ 221, 223 at a decoder stage of the wireless receiver (e.g., decoder 440). In various examples, input signals may be provided at varying points in a receiver path. Additionally or alternatively, neuron calculator 240 may communicate with wireless transmitters 111, 113 to perform a functionality of one or more processing stages of the wireless transmitters 111, 113.

Figure 6:
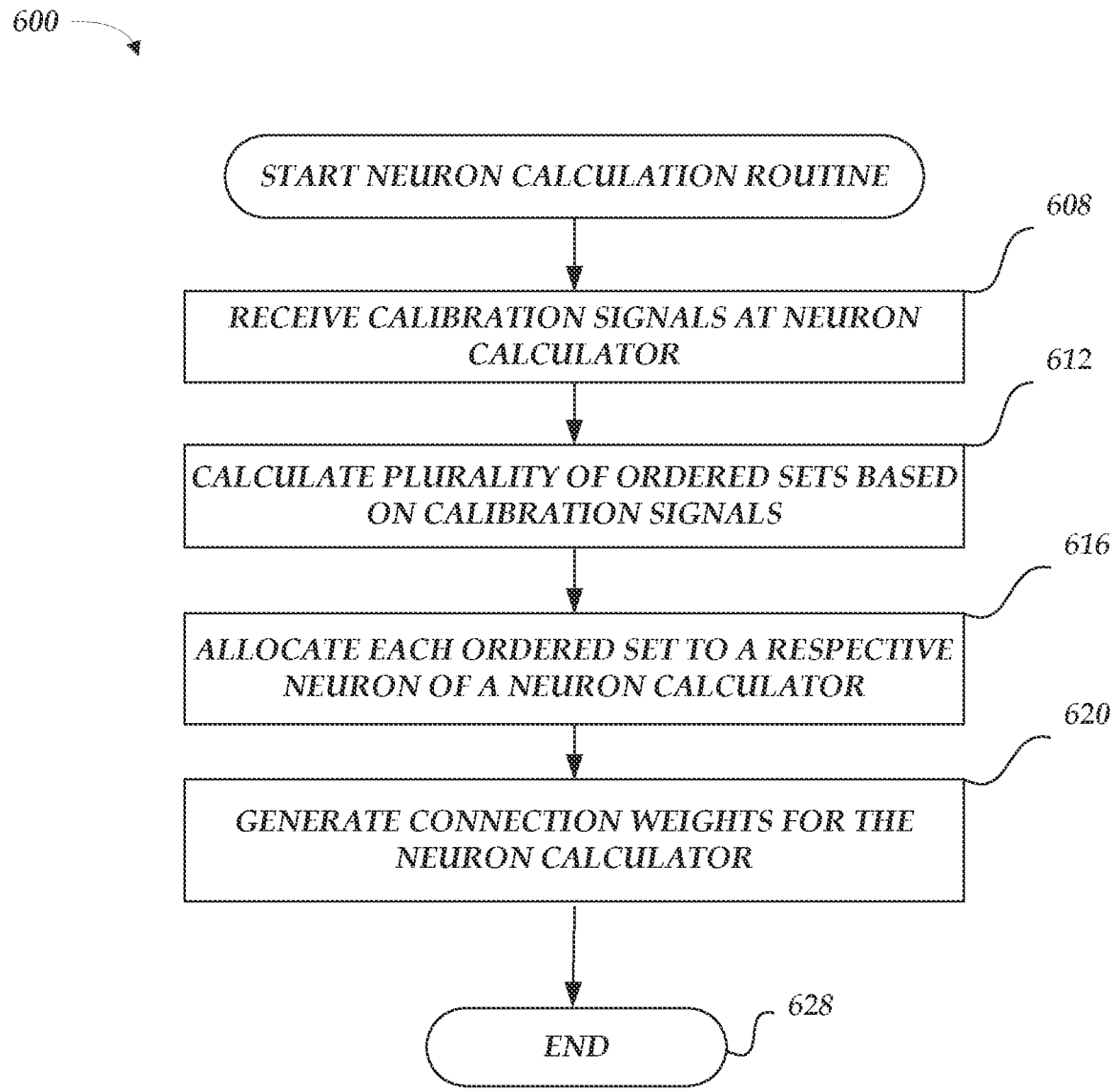
FIG. 6 is a schematic illustration of a neuron calculation method in accordance with examples described herein.

FIG. 6 is a flowchart of a method 600 in accordance with examples described herein. Example method 600 may be implemented using, for example, in electronic device 102, 110 of FIG. 2, electronic device 110 of FIG. 5, or any system or combination of the systems depicted in FIG. 2, FIG. 5, and FIGS. 7-9 described herein. In some examples, the blocks in example method 600 may be performed by a neuron calculator 18 implemented as processing unit 58. The operations described in blocks 608-628 may also be stored as control instructions in a computer-readable medium such as memory 55 or in an electronic device 110 including a memory.

Example method 600 may begin a neuron calculation method. At block 608, the method 600 includes receiving calibration signals at a neuron calculator. A neuron calculator 18 having inputs 20, 22, and 28 may receive at least respective calibration signals at each input, e.g., a first calibration signal, a second calibration signal, and a third calibration signal. Such calibration signals may be utilized to determine connection weights for the neuron calculator, as further described with respect to block 620. For example, a set of calibration signals may include a signal utilized for a wireless transmitter or wireless receiver to determine a channel estimation, e.g., a pilot signal.

At block 612, the method 600 includes calculating a plurality of ordered sets based on the calibration signals. For example, as described with respect to Table 1, calculating the plurality of ordered sets includes, multiplying each of first calibration signal, second calibration signal, and third calibration signal with one of the first calibration signal, second calibration signal, or third calibration signal to generate a second-order set of the plurality of ordered sets. Similarly, for a third-order set calculation, as described with respect to Table 2, calculating the plurality of ordered sets includes, multiplying each of the first calibration signal, second calibration signal, and third calibration signal with two signals of a set including the first calibration signal, second calibration signal, or third calibration signal to generate the third-order set. For example, with respect to the second-order set, multiplying each of first calibration signal, second calibration signal, and third calibration signal with one of the first calibration signal, second calibration signal, or third calibration signal includes multiplying the first calibration signal with the first calibration signal to generate a first multiplicative processing result of the second order set; multiplying the first calibration signal with the second calibration signal to generate a second multiplicative processing result of the second order set, multiplying the first calibration signal with the third calibration signal to generate a third multiplicative processing result of the second order set; multiplying the second calibration signal with the first calibration signal to generate a fourth multiplicative processing result of the second order set; multiplying the second calibration signal with the second calibration signal to generate a fifth multiplicative processing result of the second order set; multiplying the second calibration signal with the third calibration signal to generate a sixth multiplicative processing result of the second order set; multiplying the third calibration signal with the first calibration signal to generate a seventh multiplicative processing result of the second order set; multiplying the third calibration signal with the second calibration signal to generate an eighth multiplicative processing result of the second order set; and multiplying the third calibration signal with the third calibration signal to generate a ninth multiplicative processing result of the second order set.

At block 616, the method 600 includes allocating each ordered set of the plurality of ordered sets to a respective ordered neuron of the neuron calculator. For example, as described with respect to FIGS. 1A and 1B, the neuron calculator 18 comprises a plurality of processing units configured to process signals in accordance with respective ordered neurons. Each ordered neuron 30, 32, and 38 may be implemented at a respective processing unit 58. Or, in some examples, all ordered neurons 30, 32, and 38 may be implemented at a single processing unit 58. In allocating the ordered sets to the ordered neurons, the neuron calculator, or multiple neuron calculators 18 in a neural network 10, determine that calculated ordered sets are allocated to one or more processing units, to respective ordered neurons, for further calculation of the input signals with connection weights to generate output signals.

At block 620, the method 600 includes generating connection weights for the neuron calculator. The neuron calculator may utilize an algorithm to implement Equations 1-5 to generate the connection weights. For example, using a gradient descent method, connection weights may be randomly selected and iterated at a learning rate factor until a convergence point is reached. A connection weight may be determined for a corresponding connection between each respective ordered neuron of the neuron calculator and a respective output of a plurality of outputs of the neuron calculator. At the outputs, at least a portion of the plurality of ordered sets may be combined/mixed with at least a portion of the connection weights to generate compensated calibration signals. In iterating, an error of compensated calibrations signals based on a summation of the plurality of connection weights and at least a portion of the plurality of ordered sets may be reduced. At block 628, the method 600 ends.

The blocks included in the described example methods 600 are for illustration purposes. In some examples, the blocks may be performed in a different order. In some other examples, various blocks may be eliminated. In still other examples, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

Figure 7:
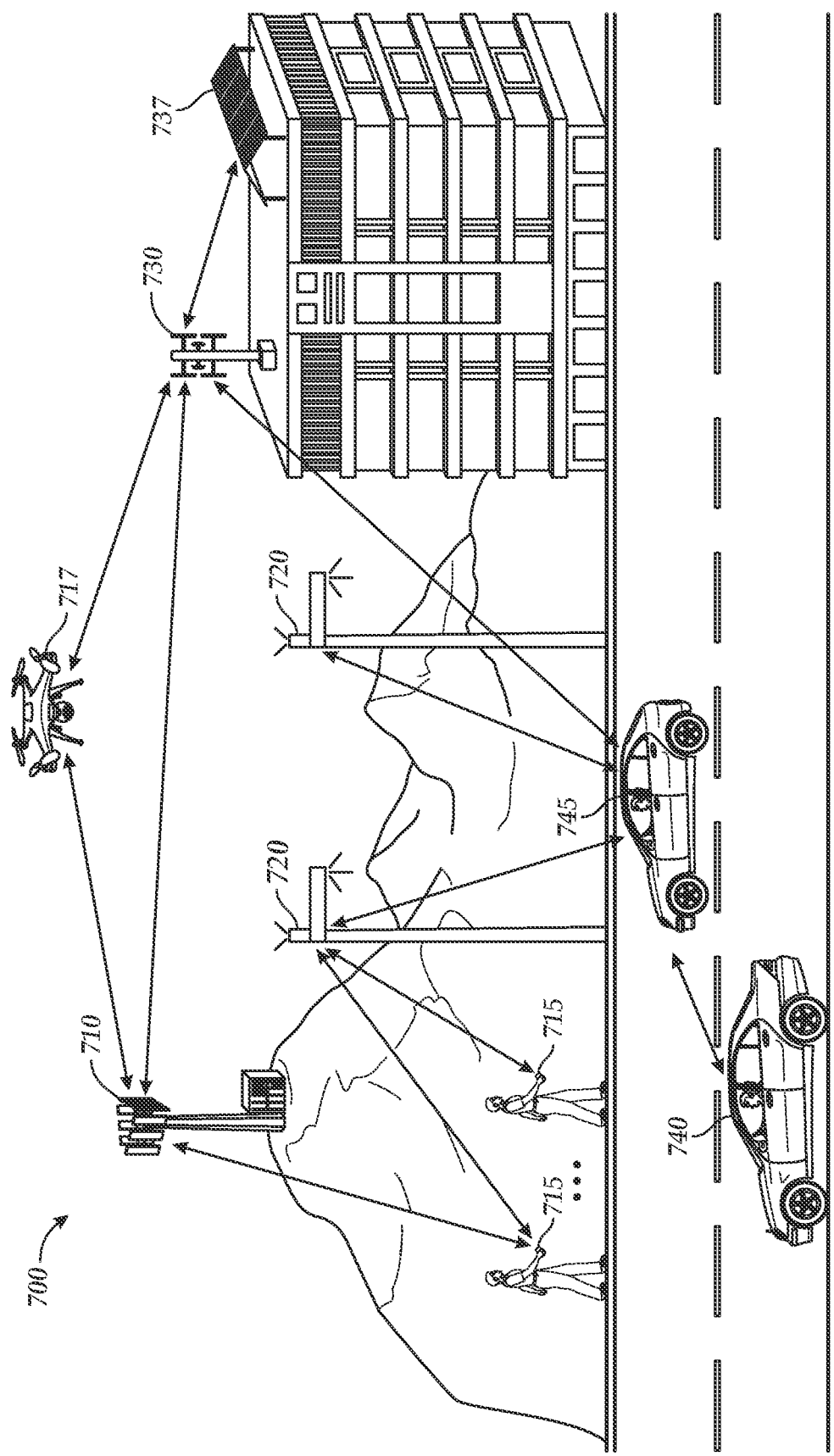
FIG. 7 is a schematic illustration of a wireless communications system arranged in accordance with aspects of the present disclosure.

FIG. 7 illustrates an example of a wireless communications system 700 in accordance with aspects of the present disclosure. The wireless communications system 700 includes a base station 710, a mobile device 715, a drone 717, a small cell 730, and vehicles 740, 745. The base station 710 and small cell 730 may be connected to a network that provides access to the Internet and traditional communication links. The system 700 may facilitate a wide-range of wireless communications connections in a 5G wireless system that may include various frequency bands, including but not limited to: a sub-6 GHz band (e.g., 700 MHz communication frequency), mid-range communication bands (e.g., 2.4 GHz), and mmWave bands (e.g., 24 GHz).

Additionally or alternatively, the wireless communications connections may support various modulation schemes, including but not limited to: filter bank multi-carrier (FBMC), the generalized frequency division multiplexing (GFDM), universal filtered multi-carrier (UFMC) transmission, bi-orthogonal frequency division multiplexing (BFDM), sparse code multiple access (SCMA), non-orthogonal multiple access (NOMA), multi-user shared access (MUSA), and faster-than-Nyquist (FTN) signaling with time-frequency packing. Such frequency bands and modulation techniques may be a part of a standards framework, such as Long Term Evolution (LTE) or other technical specification published by an organization like 3GPP or IEEE, which may include various specifications for subcarrier frequency ranges, a number of subcarriers, uplink/downlink transmission speeds, TDD/FDD, and/or other aspects of wireless communication protocols.

The system 700 may depict aspects of a radio access network (RAN), and system 700 may be in communication with or include a core network (not shown). The core network may include one or more serving gateways, mobility management entities, home subscriber servers, and packet data gateways. The core network may facilitate user and control plane links to mobile devices via the RAN, and it may be an interface to an external network (e.g., the Internet). Base stations 710, communication devices 720, and small cells 730 may be coupled with the core network or with one another, or both, via wired or wireless backhaul links (e.g., S1 interface, X2 interface, etc.).

The system 700 may provide communication links connected to devices or "things," such as sensor devices, e.g., solar cells 737, to provide an Internet of Things ("IoT") framework. Connected things within the IoT may operate within frequency bands licensed to and controlled by cellular network service providers, or such devices or things may. Such frequency bands and operation may be referred to as narrowband IoT (NB-IoT) because the frequency bands allocated for IoT operation may be small or narrow relative to the overall system bandwidth. Frequency bands allocated for NB-IoT may have bandwidths of 50, 100, or 200 KHz, for example.

Additionally or alternatively, the IoT may include devices or things operating at different frequencies than traditional cellular technology to facilitate use of the wireless spectrum. For example, an IoT framework may allow multiple devices in system 700 to operate at a sub-6 GHz band or other industrial, scientific, and medical (ISM) radio bands where devices may operate on a shared spectrum for unlicensed uses. The sub-6 GHz band may also be characterized as and may also be characterized as an NB-IoT band. For example, in operating at low frequency ranges, devices providing sensor data for "things," such as solar cells 737, may utilize less energy, resulting in power-efficiency and may utilize less complex signaling frameworks, such that devices may transmit asynchronously on that sub-6 GHz band. The sub-6 GHz band may support a wide variety of uses case, including the communication of sensor data from various sensors devices. Examples of sensor devices include sensors for detecting energy, heat, light, vibration, biological signals (e.g., pulse, EEG, EKG, heart rate, respiratory rate, blood pressure), distance, speed, acceleration, or combinations thereof. Sensor devices may be deployed on buildings, individuals, and/or in other locations in the environment. The sensor devices may communicate with one another and with computing systems which may aggregate and/or analyze the data provided from one or multiple sensor devices in the environment. Such data may be used to indicate an environmental characteristic of the sensor.

In such a 5G framework, devices may perform functionalities performed by base stations in other mobile networks (e.g., UMTS or LTE), such as forming a connection or managing mobility operations between nodes (e.g., handoff or reselection). For example, mobile device 715 may receive sensor data from the user utilizing the mobile device 715, such as blood pressure data, and may transmit that sensor data on a narrowband IoT frequency band to base station 710. In such an example, some parameters for the determination by the mobile device 715 may include availability of licensed spectrum, availability of unlicensed spectrum, and/or time-sensitive nature of sensor data. Continuing in the example, mobile device 715 may transmit the blood pressure data because a narrowband IoT band is available and can transmit the sensor data quickly, identifying a time-sensitive component to the blood pressure (e.g., if the blood pressure measurement is dangerously high or low, such as systolic blood pressure is three standard deviations from norm).

Additionally or alternatively, mobile device 715 may form device-to-device (D2D) connections with other mobile devices or other elements of the system 700. For example, the mobile device 715 may form RFID, WiFi, MultiFire, Bluetooth, or Zigbee connections with other devices, including communication device 720 or vehicle 745. In some examples, D2D connections may be made using licensed spectrum bands, and such connections may be managed by a cellular network or service provider. Accordingly, while the above example was described in the context of narrowband IoT, it can be appreciated that other device-to-device connections may be utilized by mobile device 715 to provide information (e.g., sensor data) collected on different frequency bands than a frequency band determined by mobile device 715 for transmission of that information.

Moreover, some communication devices may facilitate ad-hoc networks, for example, a network being formed with communication devices 720 attached to stationary objects) and the vehicles 740, 745, without a traditional connection to a base station 710 and/or a core network necessarily being formed. Other stationary objects may be used to support communication devices 720, such as, but not limited to, trees, plants, posts, buildings, blimps, dirigibles, balloons, street signs, mailboxes, or combinations thereof. In such a system 700, communication devices 720 and small cell 730 (e.g., a small cell, femtocell, WLAN access point, cellular hotspot, etc.) may be mounted upon or adhered to another structure, such as lampposts and buildings to facilitate the formation of ad-hoc networks and other IoT-based networks. Such networks may operate at different frequency bands than existing technologies, such as mobile device 715 communicating with base station 710 on a cellular communication band.

The communication devices 720 may form wireless networks, operating in either a hierarchal or ad-hoc network fashion, depending, in part, on the connection to another element of the system 700. For example, the communication devices 720 may utilize a 700 MHz communication frequency to form a connection with the mobile device 715 in an unlicensed spectrum, while utilizing a licensed spectrum communication frequency to form another connection with the vehicle 745. Communication devices 720 may communicate with vehicle 745 on a licensed spectrum to provide direct access for time-sensitive data, for example, data for an autonomous driving capability of the vehicle 745 on a 5.9 GHz band of Dedicated Short Range Communications (DSRC).

Vehicles 740 and 745 may form an ad-hoc network at a different frequency band than the connection between the communication device 720 and the vehicle 745. For example, for a high bandwidth connection to provide time-sensitive data between vehicles 740, 745, a 24 GHz mmWave band may be utilized for transmissions of data between vehicles 740, 745. For example, vehicles 740, 745 may share real-time directional and navigation data with each other over the connection while the vehicles 740, 745 pass each other across a narrow intersection line. Each vehicle 740, 745 may be tracking the intersection line and providing image data to an image processing algorithm to facilitate autonomous navigation of each vehicle while each travels along the intersection line. In some examples, this real-time data may also be substantially simultaneously shared over an exclusive, licensed spectrum connection between the communication device 720 and the vehicle 745, for example, for processing of image data received at both vehicle 745 and vehicle 740, as transmitted by the vehicle 740 to vehicle 745 over the 24 GHz mmWave band. While shown as automobiles in FIG. 7, other vehicles may be used including, but not limited to, aircraft, spacecraft, balloons, blimps, dirigibles, trains, submarines, boats, ferries, cruise ships, helicopters, motorcycles, bicycles, drones, or combinations thereof.

While described in the context of a 24 GHz mmWave band, it can be appreciated that connections may be formed in the system 700 in other mmWave bands or other frequency bands, such as 28 GHz, 37 GHz, 38 GHz, 39 GHz, which may be licensed or unlicensed bands. In some cases, vehicles 740, 745 may share the frequency band that they are communicating on with other vehicles in a different network. For example, a fleet of vehicles may pass vehicle 740 and, temporarily, share the 24 GHz mmWave band to form connections among that fleet, in addition to the 24 GHz mmWave connection between vehicles 740, 745. As another example, communication device 720 may substantially simultaneously maintain a 700 MHz connection with the mobile device 715 operated by a user (e.g., a pedestrian walking along the street) to provide information regarding a location of the user to the vehicle 745 over the 5.9 GHz band. In providing such information, communication device 720 may leverage antenna diversity schemes as part of a massive MIMO framework to facilitate time-sensitive, separate connections with both the mobile device 715 and the vehicle 745. A massive MIMO framework may involve a transmitting and/or receiving devices with a large number of antennas (e.g., 12, 20, 64, 128, etc.), which may facilitate precise beamforming or spatial diversity unattainable with devices operating with fewer antennas according to legacy protocols (e.g., WiFi or LTE).

The base station 710 and small cell 730 may wirelessly communicate with devices in the system 700 or other communication-capable devices in the system 700 having at the least a sensor wireless network, such as solar cells 737 that may operate on an active/sleep cycle, and/or one or more other sensor devices. The base station 710 may provide wireless communications coverage for devices that enter its coverages area, such as the mobile device 715 and the drone 717. The small cell 730 may provide wireless communications coverage for devices that enter its coverage area, such as near the building that the small cell 730 is mounted upon, such as vehicle 745 and drone 717.

Generally, the small cell 730 may be referred to as a small cell and provide coverage for a local geographic region, for example, coverage of 200 meters or less in some examples. This may be contrasted with a macrocell, which may provide coverage over a wide or large area on the order of several square miles or kilometers. In some examples, a small cell 730 may be deployed (e.g., mounted on a building) within some coverage areas of a base station 710 (e.g., a macrocell) where wireless communications traffic may be dense according to a traffic analysis of that coverage area. For example, a small cell 730 may be deployed on the building in FIG. 7 in the coverage area of the base station 710 if the base station 710 generally receives and/or transmits a higher amount of wireless communication transmissions than other coverage areas of that base station 710. A base station 710 may be deployed in a geographic area to provide wireless coverage for portions of that geographic area. As wireless communications traffic becomes denser, additional base stations 710 may be deployed in certain areas, which may alter the coverage area of an existing base station 710, or other support stations may be deployed, such as a small cell 730. Small cell 730 may be a femtocell, which may provide coverage for an area smaller than a small cell (e.g., 100 meters or less in some examples (e.g., one story of a building)).

While base station 710 and small cell 730 may provide communication coverage for a portion of the geographical area surrounding their respective areas, both may change aspects of their coverage to facilitate faster wireless connections for certain devices. For example, the small cell 730 may primarily provide coverage for devices surrounding or in the building upon which the small cell 730 is mounted. However, the small cell 730 may also detect that a device has entered is coverage area and adjust its coverage area to facilitate a faster connection to that device.

For example, a small cell 730 may support a massive MIMO connection with the drone 717, which may also be referred to as an unmanned aerial vehicle (UAV), and, when the mobile device 715 enters it coverage area, the small cell 730 adjusts some antennas to point directionally in a direction of the device 715, rather than the drone 717, to facilitate a massive MIMO connection with the vehicle, in addition to the drone 717. In adjusting some of the antennas, the small cell 730 may not support as fast as a connection to the drone 717, as it had before the adjustment. However, the drone 717 may also request a connection with another device (e.g., base station 710) in its coverage area that may facilitate a similar connection as described with reference to the small cell 730, or a different (e.g., faster, more reliable) connection with the base station 710. Accordingly, the small cell 730 may enhance existing communication links in providing additional connections to devices that may utilize or demand such links. For example, the small cell 730 may include a massive MIMO system that directionally augments a link to vehicle 745, with antennas of the small cell directed to the vehicle 745 for a specific time period, rather than facilitating other connections (e.g., the small cell 730 connections to the base station 710, drone 717, or solar cells 737). In some examples, drone 717 may serve as a movable or aerial base station.

The wireless communications system 700 may include devices such as base station 710, communication device 720, and small cell 730 that may support several connections to devices in the system 700. Such devices may operate in a hierarchal mode or an ad-hoc mode with other devices in the network of system 700. While described in the context of a base station 710, communication device 720, and small cell 730, it can be appreciated that other devices that can support several connections with devices in the network may be included in system 700, including but not limited to: macrocells, femtocells, routers, satellites, and RFID detectors.

In various examples, the elements of wireless communication system 700, such as the drone 717, may be implemented utilizing the systems, apparatuses, and methods described herein. For example, the drone 717, being implemented as the electronic device 110, may receive a wireless communication signal from base station 710. In demodulating and decoding the received wireless communications signal, the drone 717 may also implement a neuron calculator 18 to calculate output signals for one or more processing stages of a wireless receiver path. For example, the drone 717 may implement the neuron calculator 18 for channel estimation to determine an error introduced by the wireless channel between the base station 710 and the drone 717. In calculating the output signals for channel estimation as part of a neuron calculator 18, the drone 717 may utilize less-power and less-memory, as the ordered sets of the neuron calculator 18 are calculated based on the received wireless communications signal from the base station 710. Accordingly, the drone 717 may utilize less die space on a silicon chip than conventional signal processing systems and techniques that can include additional hardware or specially-designed hardware, thereby allowing the drone 717 to be of smaller size compared to drones having such conventional signal processing systems and techniques.

Additionally or alternatively, while described in the examples above in the context of the drone 717, the elements of communication system 700 may be implemented as part of any example described herein, such as electronic device 102, 110 of FIG. 2, electronic device 110 of FIG. 5, or any system or combination of the systems depicted in the Figures described herein.

Figure 8:
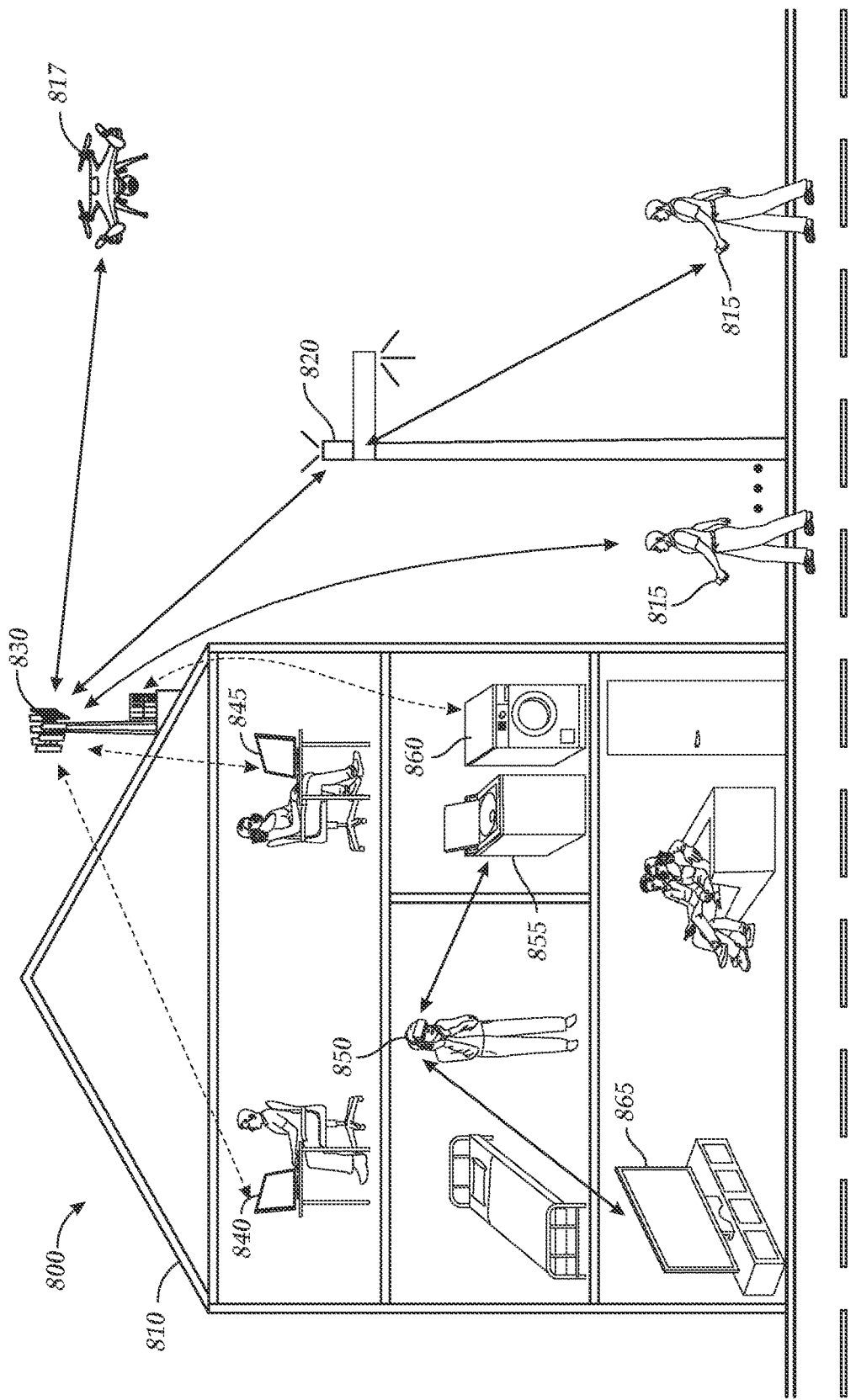
FIG. 8 is a schematic illustration of a wireless communications system arranged in accordance with aspects of the present disclosure.

FIG. 8 illustrates an example of a wireless communications system 800 in accordance with aspects of the present disclosure. The wireless communications system 800 includes a mobile device 815, a drone 817, a communication device 820, and a small cell 830. A building 810 also includes devices of the wireless communications system 800 that may be configured to communicate with other elements in the building 810 or the small cell 830. The building 810 includes networked workstations 840, 845, virtual reality device 850, IoT devices 855, 860, and networked entertainment device 865. In the depicted wireless communications system 800, IoT devices 855, 860 may be a washer and dryer, respectively, for residential use, being controlled by the virtual reality device 850. Accordingly, while the user of the virtual reality device 850 may be in different room of the building 810, the user may control an operation of the IoT device 855, such as configuring a washing machine setting. Virtual reality device 850 may also control the networked entertainment device 865. For example, virtual reality device 850 may broadcast a virtual game being played by a user of the virtual reality device 850 onto a display of the networked entertainment device 865.

The small cell 830 or any of the devices of building 810 may be connected to a network that provides access to the Internet and traditional communication links. Like the system 700, the wireless communications system 800 may facilitate a wide-range of wireless communications connections in a 5G system that may include various frequency bands, including but not limited to: a sub-6 GHz band (e.g., 700 MHz communication frequency), mid-range communication bands (e.g., 2.4 GHz), and mmWave bands (e.g., 24 GHz). Additionally or alternatively, the wireless communications connections may support various modulation schemes as described above with reference to system 700. Wireless communications system 800 may operate and be configured to communicate analogously to system 700. Accordingly, similarly numbered elements of wireless communications system 800 and system 700 may be configured in an analogous way, such as communication device 720 to communication device 820, small cell 730 to small cell 830, etc.

Like the system 700, where elements of system 700 are configured to form independent hierarchal or ad-hoc networks, communication device 820 may form a hierarchal network with small cell 830 and mobile device 815, while an additional ad-hoc network may be formed among the small cell 830 network that includes drone 817 and some of the devices of the building 810, such as networked workstations 840, 845 and IoT devices 855, 860.

Devices in wireless communications system 800 may also form (D2D) connections with other mobile devices or other elements of the wireless communications system 800. For example, the virtual reality device 850 may form a narrowband IoT connections with other devices, including IoT device 855 and networked entertainment device 865. As described above, in some examples, D2D connections may be made using licensed spectrum bands, and such connections may be managed by a cellular network or service provider. Accordingly, while the above example was described in the context of a narrowband IoT, it can be appreciated that other device-to-device connections may be utilized by virtual reality device 850.

In various examples, the elements of wireless communications system 800, such as the mobile device 815, the drone 817, the communication device 820, the small cell 830, the networked workstations 840, 845, the virtual reality device 850, the IoT devices 855, 860, and the networked entertainment device 865, may be implemented as part of any example described herein, such as electronic device 102, 110 of FIG. 2, electronic device 110 of FIG. 5, or any system or combination of the systems depicted in the Figures described herein.

Figure 9:
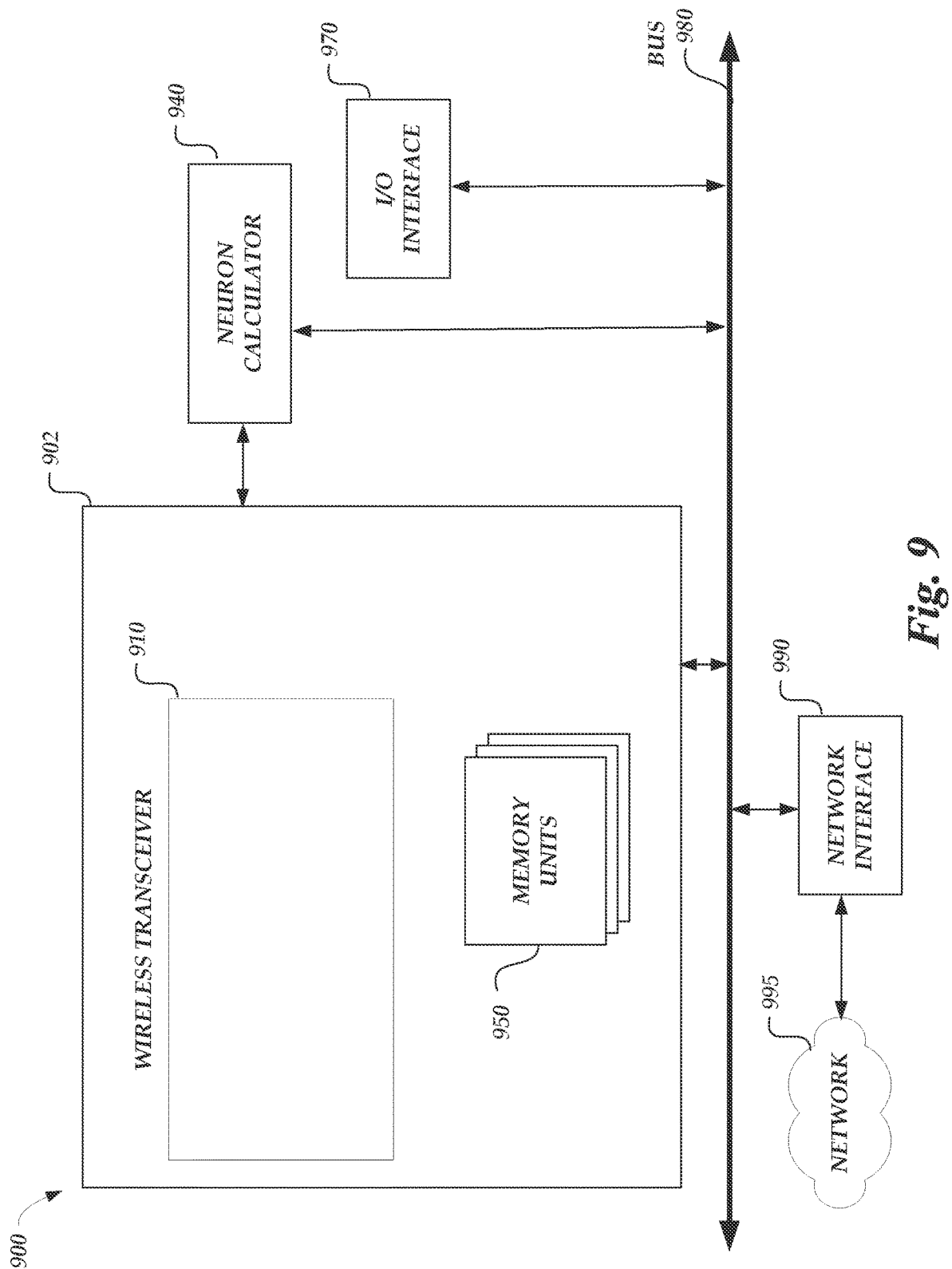
FIG. 9 is a block diagram of a computing device arranged in accordance with examples described herein.

FIG. 9 is a block diagram of an electronic device 900 arranged in accordance with examples described herein. The electronic device 900 may operate in accordance with any example described herein, such as electronic device 102, 110 of FIG. 2, electronic device 110 of FIG. 5, or any system or combination of the systems depicted in the Figures described herein. The electronic device 900 may be implemented in a smartphone, a wearable electronic device, a server, a computer, an appliance, a vehicle, or any type of electronic device. The electronic device 900 includes a computing system 902, a neuron calculator 940, an I/O interface 970, and a network interface 990 coupled to a network 995. The computing system 902 includes a wireless transceiver 910. The wireless transceiver may include a wireless transmitter and/or wireless receiver, such as wireless transmitter 300 and wireless receiver 400. Neuron calculator 940 may include any type of microprocessor, central processing unit (CPU), an application specific integrated circuits (ASIC), a digital signal processor (DSP) implemented as part of a field-programmable gate array (FPGA), a system-on-chip (SoC), or other hardware to provide processing for device 900.

The computing system 902 includes memory 950 (e.g., memory look-up unit), which may be non-transitory hardware readable medium including instructions, respectively, for calculating neuron or be memory for the retrieval, calculation, or storage of data signals to be compensated or adjusted signals based on calculated neuron. The neuron calculator 940 may control the computing system 902 with control instructions that indicate when to execute such stored instructions for calculating neuron or for the retrieval or storage of data signals to be compensated or adjusted signals based on calculated neuron. Upon receiving such control instructions, the wireless transceiver 910 may execute such instructions. For example, such instructions may include a program that executes the method 600. Communications between the neuron calculator 940, the I/O interface 970, and the network interface 990 are provided via an internal bus 980. The neuron calculator 940 may receive control instructions from the I/O interface 970 or the network interface 990, such as instructions to calculate ordered sets for ordered neurons or connection weights.

Bus 980 may include one or more physical buses, communication lines/interfaces, and/or point-to-point connections, such as Peripheral Component Interconnect (PCI) bus, a Gen-Z switch, a CCIX interface, or the like. The I/O interface 970 can include various user interfaces including video and/or audio interfaces for the user, such as a tablet display with a microphone. Network interface 990 communications with other electronic devices, such as electronic device 900 or a cloud-electronic server, over the network 995. For example, the network interface 990 may be a USB interface.

Certain details are set forth above to provide a sufficient understanding of described examples. However, it will be clear to one skilled in the art that examples may be practiced without various of these particular details. The description herein, in connection with the appended drawings, describes example configurations and does not represent all the examples that may be implemented or that are within the scope of the claims. The terms "exemplary" and "example" as may be used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Techniques described herein may be used for various wireless communications systems, which may include multiple access cellular communication systems, and which may employ code division multiple access (CDMA), time division multiple access (TDMA), frequency division multiple access (FDMA), orthogonal frequency division multiple access (OFDMA), or single carrier frequency division multiple access (SC-FDMA), or any a combination of such techniques. Some of these techniques have been adopted in or relate to standardized wireless communication protocols by organizations such as Third Generation Partnership Project (3GPP), Third Generation Partnership Project 2 (3GPP2) and IEEE. These wireless standards include Ultra Mobile Broadband (UMB), Universal Mobile Telecommunications System (UMTS), Long Term Evolution (LTE), LTE-Advanced (LTE-A), LTE-A Pro, New Radio (NR), IEEE 802.11 (WiFi), and IEEE 802.16 (WiMAX), among others.

The terms "5G" or "5G communications system" may refer to systems that operate according to standardized protocols developed or discussed after, for example, LTE Releases 13 or 14 or WiMAX 802.16e-2005 by their respective sponsoring organizations. The features described herein may be employed in systems configured according to other generations of wireless communication systems, including those configured according to the standards described above.

The various illustrative blocks and modules described in connection with the disclosure herein may be implemented or performed with a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above are also included within the scope of computer-readable media.

Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Certain details are set forth herein to provide a sufficient understanding of embodiments of the present disclosure. However, it will be clear to one skilled in the art that embodiments of the present disclosure may be practiced without various of these particular details. In some instances, well-known wireless communication components, circuits, control signals, timing protocols, computing system components, telecommunication components, and software operations have not been shown in detail in order to avoid unnecessarily obscuring the described embodiments of the present disclosure.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific examples have been described herein for purposes of illustration, various modifications may be made while remaining with the scope of the claimed technology. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus comprising:
   a plurality of transmission devices coupled to sensors, the plurality of transmission devices configured to transmit sensor data in accordance with a wireless communication protocol; and
   a receiver configured to receive narrowband Internet of Things (IoT) transmissions from the plurality of transmission devices and coupled to a neuron processor, the neuron processor comprising a plurality of multiplication/accumulation (MAC) units, and wherein, using the plurality of MAC units, the neuron processor is configured to mix, via a plurality of ordered neurons of the neuron processor, the narrowband IoT transmissions with a plurality of ordered sets and a plurality of connection weights to generate output data.

2. The apparatus of claim 1, wherein the receiver is configured to receive the narrowband IoT transmissions on a narrowband IoT band at one or more antennas coupled to the receiver.

3. The apparatus of claim 2, wherein the narrowband IoT band corresponds to a sub-6 GHz band.

4. The apparatus of claim 1, wherein the transmission devices are configured to operate on a sub-6 GHz band or on a shared spectrum for unlicensed wireless spectrum uses.

5. The apparatus of claim 1, wherein the neuron processor further comprises a non-transitory computer readable media encoded with executable instructions which, when executed by the neuron processor, is configured to cause the apparatus to process the narrowband IoT transmissions using the plurality of MAC units, wherein the processing comprises:
   combining, at least a portion of the plurality of MAC units, the narrowband IoT transmission with the ordered sets to generate a plurality of intermediate signals; and
   combining, at least another portion of the plurality of MAC units, the plurality of intermediate signals with the ordered sets to generate the output data as a plurality of output signals.

6. The apparatus of claim 5, wherein the neuron processor further comprises a plurality of memory look-up units, and wherein the processing further comprises:
   receiving, from at least a portion of the plurality of memory look-up units, the ordered sets.

7. The apparatus of claim 1, wherein the transmission devices comprises one or more of an IoT device, a virtual reality device, a mobile device, a drone, a communication device, or a vehicle device.

8. The apparatus of claim 1, wherein the wireless communication protocol includes the use of a device-to-device (D2D) connection between the receiver and each respective transmission device of the plurality of transmission devices.

9. The apparatus of claim 8, wherein the D2D connection is implemented using at least one of a RFD connection, a WiFi connection, a MultiFire connection, a Bluetooth connection, or a Zigbee connection.

10. An apparatus comprising:
    a processor coupled to a first receiver configured to process a first radio frequency (RF) signal from a first vehicle and a second receiver configured to process a second RF signal from a second vehicle, the processor further configured to receive a first input signal based on the first RF signal and a second input signal based on the second RF signal, the processor configured to calculate a plurality of ordered sets and a plurality of connection weights to generate a plurality of output signals, wherein the processor comprises:
    a plurality of multiplication/accumulation processing units; and
    a non-transitory computer readable media encoded with executable instructions which, when executed by the processor, is configured to cause the apparatus to perform operations comprising:
       combining, at at least a portion of the plurality of multiplication/accumulation (MAC) units, first and second input signals of a plurality of signals with a second-order set of the plurality of ordered sets to generate the plurality of output signals, wherein a count of elements in the second order set is equal to a count of the first and second input signals multiplied by an order of the second order neuron.

11. The apparatus of claim 10, wherein the first input signal includes data indicative of directional and navigation data of the first vehicle.

12. The apparatus of claim 10, wherein the plurality of output signals include data used to facilitate autonomous navigation of the first and second vehicle while each travels along a road intersection line.

13. The apparatus of claim 10, wherein a frequency band of the first RF signal and the second RF signal corresponds to at least one of 1 MHz, 5 MHz, 10 MHz, 20 MHz, 700 MHz, 2.4 GHz, or 24 GHz.

14. The apparatus of claim 10, wherein the combining the first and second input signals of the plurality of signals with the plurality of ordered sets to generate the plurality of output signals comprises:
    combining, at at least the portion of the plurality of MAC units of a second-ordered neuron, the first and second signals of the plurality of signals with the second-order set to generate a plurality of intermediate signals; and
    combining, at least another portion of the plurality of MAC units of the second-ordered neuron, the plurality of intermediate signals with the second-order set to generate a plurality of output signals.

15. The apparatus of claim 14, wherein the operations further comprising:
    receiving a plurality of calibration signals;
    generating the second-order set for the plurality of ordered sets based at least in part on multiplying each calibration signal of the plurality of calibration signals with another calibration signal of the plurality of calibration signals; and allocating the second-order set to the second-ordered neuron of a neuron calculator implemented by the processor.

16. The apparatus of claim 10, wherein the processor being implemented as part of at least one of a base station, small cell, mobile device, drone, communication device, or a device configured to operate on a narrowband Internet of Things (IoT) frequency band.

17. A method comprising:

calculating a plurality of signals at a neural network with a kth-ordered neuron, wherein k represents a number of a plurality of calibration signals that are selected to generate the kth-ordered neuron, wherein calculating the plurality of signals at the neural network with the kth-ordered neuron comprises:

combining, at least a portion of a plurality of multiplication/accumulation (MAC) units of the kth-ordered neuron, a plurality of signals with a kth-order set to generate a plurality of intermediate signals; and combining, at least another portion of the plurality of MAC units of the kth-ordered neuron, the plurality of intermediate signals with the kth-ordered set to generate a plurality of output signals, wherein the kth-ordered neuron comprises product values based on combinations of at least one calibration signal of the plurality of calibration signals and another calibration signal of the plurality of calibration signals multiplied with itself $k-1$ times;

selecting a set of k-combinations including repetition from among the plurality of calibration signals; and based on the selecting, generating the kth-ordered set for a plurality of ordered sets based at least in part on multiplying each calibration signal of a plurality of calibration signals with at least another calibration signal of the plurality of calibration signals.

18. The method of claim 17, further comprising:

receiving a plurality of radio frequency (RF) signals at respective antennas of a plurality of antennas, the plurality of RF signals from respective vehicles of a plurality of vehicles; and providing the plurality of RF signals to the kth-ordered neuron as the plurality of signals.

* * * * *

UNITED STATES PATENT AND TRADEMARK OFFICE
CERTIFICATE OF CORRECTION

PATENT NO. : 11,870,513 B2
APPLICATION NO. : 17/362672
DATED : January 9, 2024
INVENTOR(S) : Fa-Long Luo et al.

It is certified that error appears in the above-identified patent and that said Letters Patent is hereby corrected as shown below:

In the Claims

| Column | Line | Claim | Reads | Should Read |
|--------|------|-------|-------------------|--------------------|
| 26     | 10   | 9     | a RFD connection  | a RFID connection  |

Signed and Sealed this
Nineteenth Day of March, 2024

Katherine Kelly Vidal
*Director of the United States Patent and Trademark Office*